US012755217B2

(12) United States Patent
Takáč et al.

(10) Patent No.: US 12,755,217 B2
(45) Date of Patent: Oct. 6, 2026

(54) SYSTEM AND METHOD FOR A HIERARCHICAL MULTI-AGENT FRAMEWORK FOR TRANSACTIVE MICROGRIDS

(71) Applicant: Mohamed bin Zayed University of Artificial Intelligence, Abu Dhabi (AE)

(72) Inventors: Martin Takáč, Abu Dhabi (AE); Nicolás Mauricio Cuadrado Ávila, Abu Dhabi (AE); Roberto Alejandro Gutiérrez Guillén, Abu Dhabi (AE); Samuel Horvath, Abu Dhabi (AE)

(73) Assignee: Mohamed bin Zayed University of Artificial Intelligence, Abu Dhabi (AE)

( * ) Notice: Subject to any disclaimer, the term of this patent is extended or adjusted under 35 U.S.C. 154(b) by 382 days.

(21) Appl. No.: 18/587,182

(22) Filed: Feb. 26, 2024

(65) Prior Publication Data

US 2025/0272621 A1 Aug. 28, 2025

(51) Int. Cl.
*G06Q 10/04* (2023.01)
*G06Q 50/06* (2012.01)

(52) U.S. Cl.
CPC ............ *G06Q 10/04* (2013.01); *G06Q 50/06* (2013.01)

(58) Field of Classification Search
None
See application file for complete search history.

(56) References Cited

U.S. PATENT DOCUMENTS

| | | | | |
|---|---|---|---|---|
| 2019/0267808 | A1 | 8/2019 | Weindl et al. | |
| 2022/0337061 | A1 | 10/2022 | Lee et al. | |
| 2023/0216298 | A1* | 7/2023 | Gokhale et al. | H02J 3/06 |
| 2024/0143975 | A1* | 5/2024 | Kroener et al. | G06N 3/04 |

FOREIGN PATENT DOCUMENTS

| | | | | | |
|---|---|---|---|---|---|
| CA | 3205651 | A1 | * | 8/2022 | H02J 7/971 |
| CN | 112488224 | A | | 3/2021 | |
| CN | 113098007 | A | * | 7/2021 | H02J 3/00 |
| CN | 110445173 | B | * | 5/2023 | G06Q 10/06315 |
| CN | 114611772 | B | * | 4/2024 | G06Q 10/04 |

(Continued)

OTHER PUBLICATIONS

Min Shojaeighadikolaei et al. Distributed Energy Management and Demand Response in Smart Grids: A Multi-Agent Deep Reinforcement Learning Framework, Nov. 29, 2022 (Year: 2022).*

(Continued)

*Primary Examiner* — Howard Cortes
(74) *Attorney, Agent, or Firm* — Oblon, McClelland, Maier & Neustadt, L.L.P.

(57) ABSTRACT

A multi-agent reinforcement learning framework for managing energy transactions in microgrids that includes three layers of agents, each pursuing different objectives. The first layer, including prosumers and consumers, minimizes the total energy cost. The other two layers control the energy price to decrease the carbon emission impact while balancing the consumption and production of both renewable and conventional energy. The framework takes into account fluctuations in energy demand and supply due to household supplied energy from renewable energy sources and energy storage levels in household energy storage devices.

17 Claims, 25 Drawing Sheets

(56) References Cited

FOREIGN PATENT DOCUMENTS

| | | | | |
|---|---|---|---|---|
| CN | 118735123 A | * 10/2024 | ................ | H02J 3/28 |
| CN | 119382104 B | * 12/2025 | ................ | H02J 3/00 |

OTHER PUBLICATIONS

Chen Feng et al. Decentralized Voltage Control with Peer-to-peer Energy Trading in a Distribution Network, Dec. 29, 2022 (Year: 2022).*

Jiankai Gao et al. Multi-Microgrid Collaborative Optimization Scheduling Using an Improved Multi-Agent Soft Actor-Critic Algorithm, Apr. 1, 2023 (Year: 2023).*

Zhiwen Yu et al. Energy optimization management of microgrid using improved soft actor-critic algorithm, Feb. 28, 2024 (Year: 2024).*

Akter et al. ; A Hierarchical Transactive Energy Management System for Energy Sharing in Residential Microgrids ; MDPI energies 10 ; Dec. 11, 2017 ; 27 Pages.

* cited by examiner

SYSTEM AND METHOD FOR A HIERARCHICAL MULTI-AGENT FRAMEWORK FOR TRANSACTIVE MICROGRIDS

CROSS-REFERENCE TO RELATED APPLICATIONS

This application to U.S. application titled "A Federated Reinforcement Learning-Based System and Method for Cooperative Energy Optimization" (Docket Number 549314US), the entire contents of which are incorporated herein by reference.

STATEMENT REGARDING PRIOR DISCLOSURE BY THE INVENTORS

Aspects of this technology are described in Cuadrado, Nicolas, Roberto Gutierrez, Yongli Zhu, and Martin Takac, "MAHTM: A Multi-Agent Framework for Hierarchical Transactive Microgrids." *arXiv preprint arXiv:* 2303.08447 (2023), which is incorporated herein by reference in its entirety. The program code and the data are available at: tinyurl.com/rlenergy, which is incorporated herein by reference in its entirety. Aspects of this technology are described in NM Cuadrado, RAG Guillen, M Takáč, FRESCO: Federated Reinforcement Energy System for Cooperative Optimization, ICLR 2023 Tiny Papers, May 5, 2023, which is incorporated herein by reference in its entirety.

BACKGROUND

Technical Field

The present disclosure is directed to a system and method of transactive control of microgrids, in particular, a multi-agent reinforcement learning framework for managing energy transactions in microgrids. The framework consists of three layers of agents, each pursuing different objectives. The first layer minimizes the total energy cost. The other two layers control the energy price to minimize the carbon footprint while balancing the consumption and production of both renewable and conventional energy.

Description of Related Art

Climate change is occurring at a rate that needs to be taken seriously as a major global problem. Data on anomalies over the last hundred years strongly supports that climate change is occurring. FIG. 1 is a histogram of temperature anomalies since 1880. See Monthly Global Climate Report for Annual 2022, NOAA National Centers for Environmental Information. The histogram exhibits a trend from mostly below normal temperatures before 1940 to mostly above normal temperatures after 1980. Moreso, the above normal temperatures are generally increasing.

Carbon dioxide emissions from power generation contributes about 30 percent of global emissions. A large amount of this carbon dioxide emission results from burning of fossil fuels to produce energy. Coal-fired generation accounts for nearly 60 percent of the carbon dioxide emissions, and a substantial portion of the remaining amount result from the burning of natural gas. Emissions of carbon dioxide in the electric power sector have declined by about 35 percent since about 2005. About two-thirds of the decline in carbon dioxide emissions in that sector has occurred because of the switch from coal to natural gas, and about one-third has come from increased generation from renewable sources, which do not release carbon dioxide. Wind and solar generation—which account for nearly all the growth of renewable generation—have together increased from less than 1 percent of all generation to nearly 13 percent. However, the challenge lays not only in the renewable generation but guaranteeing there is enough to supply the demand since the generation of renewable energy is inherently stochastic (depends on multiple climate factors).

As technology and urban areas continue to grow, the demand for energy increases and is expected to continue to be high. Because of this, the world is seeking greener options, increasing the demand for renewable energy from industry and residential consumers. See Benjamin D. Leibowicz, Christopher M. Lanham, Max T. Brozynski, José R. Vázquez-Canteli, Nicolás Castillo Castejón, and Zoltan Nagy. Optimal decarbonization pathways for urban residential building energy services. *Applied Energy,* 230:1311-1325, 2018. ISSN 0306-2619. doi: doi.org/10.1016/j.apenergy.2018.09.046. Between renewable energies, there is solar, wind, tidal, hydropower, and bio-energy.

Conventional energy grids are composed of dispatchable power plants which are a predictable source of electric power. These dispatchable power plants can be turned on and off as needed. On the other hand, renewable energy sources are stochastic, i.e., they generate energy in a somewhat random manner. Renewable energy sources are dependent on many factors, including weather conditions, temperature, geographic region, time of day, location. Also, research has shown that renewable energy sources, in particular solar electric generation, can lead to a problem of overgeneration. Conventional power plants generate electricity by burning hydrocarbon fuels (e.g., fossil fuels) such as coal, oil and gas and/or from other sources such as nuclear fission an/or fusion.

FIG. 2 is a graph for an example of an overgeneration condition, known as the duck curve. In 2013, the California Independent System Operator (CAISO), the organization that oversees California's electricity generation and transmission system, published a now-famous graph. As illustrated in FIG. 2, this graph displays the energy demand over time on a spring day, and how it is expected to change in the future. The graph also predicts energy demand over time on a typical California spring day. It was only after conducting studies on green grid deployment that researchers noticed that as small-scale solar generation increased during the day, the demand for electricity from the grid decreased (the duck belly). This is due to the excess energy of photovoltaic energy. Then, once the sun begins to set and people return home in the evening, demand on the network begins to peak (the duck's neck). Therefore, they conclude that the grid demand drops in the daytime and then increases again in the evening, as seen in the FIG. 2. In this figure, the line of the graph, especially the increasingly pronounced shape of the predictions over the years looks like the silhouette of a duck. This phenomenon was nicknamed the Duck Curve, and the name stuck. See Henri Joël Azemena, et al., Explainable Artificial Intelligent as a solution approach to the Duck Curve problem, Procedia Computer Science, Volume 207, 2022, Pages 2747-2756.

For stability, the grid should closely balance supply and demand, second by second. Frequency is maintained at around 50 or 60 hertz. In case of a sudden disruption—the unexpected loss of a power plant, transmission line, or large load—the grid needs resources capable of ramping up or down quickly to compensate.

This is done by automated frequency response systems, usually on conventional power plants. If solar starts shutting down all those plants in the middle of the day, the grid loses those resources, and with it some stability.

As a consequence, there is a need to adapt to the instability of renewable energies. One approach is to incorporate a grid management system, generally referred to as a smart grid. FIG. 3 illustrates a smart grid. See www.vectorstock.com/royalty-free-vector/smart-grid-system-diagram-isometric-vector-34477024. A smart grid may include a grid management system 310 that manages energy production by solar power farms 312, wind power farms 314, hydroelectric power plants 316, nuclear power plants 318, fossil fuel power plants 322, load from factories and businesses 302, load from cities and buildings 304, load from charging electric vehicles 306, and smart homes 308. However, smart grid management has its own problems. The scattered heterogeneous data throughout the system makes it hard to manage the diverse system.

A control approach for smart grid management includes model-based control, which takes the form of mathematical equations that describe the physical process. An example model-based control approach is Model Predictive Control. Another control approach is a data-driven, model-free method. An example data-driven approach is machine learning, in particular reinforcement learning. A further alternative control approach is a hybrid control approach. An example hybrid approach is fuzzy logic control.

Model Predictive Control (MPC) is a conventional mathematical model approach to a control system. FIG. 4 is a block diagram of an overview of a MPC controller. See Jiefeng Hu and Yinghao Shan and Josep M. Guerrero and Adrian Ioinovici and Ka Wing Chan and Jose Rodriguez, Model predictive control of microgrids—An overview, Renewable and Sustainable Energy Reviews, Vol. 136, pages 110422, 2021. An MPC controller 400 includes a predictive model 402, a cost function 404, and the solution algorithm 406. An MPC controller 400 does not need historical data and can output a near optimal solution. However, a MPC controller 400 is complex and difficult to design and implement. It is especially difficult to make changes to accommodate for hardware changes, including degradation due to wear and tear, and/or hardware failure. An MPC controller 400 can be computationally intensive, making the approach generally unsuitable for small or embedded microgrids.

FIG. 5 is a flow diagram of a MPC control approach for grid management. The approach 500 includes an input 502 to receive external inputs from the smart grid and an output to external markets 504. The external inputs 502 are input to forecasters 512. The results of the forecasters 512 are fed to the steady state optimization function 514. The optimization function 514 produces an optimal set point. The model predictive controller 520 takes the optimal set point and runs a dynamic optimization 522 and a model 524 to iterate a predicted state. The model predictive controller 520 generates a control action for a number of local controls 530. Each local control 530 includes a control function, e.g., PID control 532, to control a process 534. A measured state is fed back to the forecasters 512.

The data-driven approach involves creating specific energy systems controlled by machine learning models, which optimize the usage of the available resources. See José R. Vázquez-Canteli, Stepan Ulyanin, Jérôme Kämpf, and Zoltán Nagy. Fusing TensorFlow with building energy simulation for intelligent energy management in smart cities. *Sustainable Cities and Society,* 45:243-257, 2019. ISSN 2210-6707. doi: doi.org/10.1016/j.scs.2018.11.021, incorporated herein by reference in its entirety. For example, the concept of "smart transactive grids" has been proposed to organize the demand and production of energy in communities. The idea is to create an intelligent system that uses different energy sources to supply the demand with minimal human intervention. At the same time, it provides the opportunity to sell any surplus energy produced.

Reinforcement Learning (RL) has been used to create technologies that enable transactive microgrids. A basic Reinforcement Learning arrangement is shown in FIG. 6. See Sutton, Richard S. and Barto, Andrew G., Reinforcement Learning: An Introduction, The MIT Press, 2018. In Reinforcement Learning, an Agent network 602 learns to perform actions 612 for an environment 610. The Agent 602 is an entity that interacts with an environment 610 by perceiving its surroundings via sensors, then acting through actuators and effectors. As the Agent 602 interacts with the environment 610 through sensing, reasoning and action, the environment changes to a state 614 and can generate a reward 616 for the state change that resulted from the action. For purposes of this disclosure, an agent is a machine learning model, preferably a multi-layered neural network.

In an approach using different RL agents the distributions of agents are different: one agent is used for particular computation (e.g., optimization), called Service Agent; the other two agents collect meteorological information, and forecast the power output based on the specified type of energy (solar, wind, etc.). See Amjad Anvari-Moghaddam, Ashkan Rahimi-Kian, Maryam S. Mirian, and Josep M. Guerrero. A multi-agent based energy management solution for integrated buildings and microgrid system. *Applied Energy,* 203:41-56, 2017. ISSN 0306-2619. doi: doi.org/10.1016/j.apenergy.2017.06.007, incorporated herein by reference in its entirety. In the design of its energy management system, one battery is shared across the residential households, and all the agents communicate with a "central coordinator agent". A Multi-Agent Reinforcement Learning (MARL) approach consisting of agents sharing two variables and following a leader-follower schema to manage energy demand and generation has been proposed. See Jose R. Vazquez-Canteli, Gregor Henze, and Zoltan Nagy. Marlisa: Multi-agent reinforcement learning with iterative sequential action selection for load shaping of grid-interactive connected buildings. In *Proceedings of the 7th ACM International Conference on Systems for Energy-Efficient Buildings, Cities, and Transportation*, BuildSys '20, page 170-179, New York, NY, USA, 2020. Association for Computing Machinery. ISBN 9781450380614. doi: 10.1145/3408308.3427604, incorporated herein by reference in its entirety. A specific reward function with greedy and collective goals to incentivize the agents to work together as a community was also described.

Other MARL approaches provide solutions for similar issues. A consensus learning approach inspired by the DINO (Distillation with No Labels) was proposed. See Zhiwei Xu, Bin Zhang, Dapeng Li, Zeren Zhang, Guangchong Zhou, and Guoliang Fan. Consensus learning for cooperative multi-agent reinforcement learning, 2022; and Mathilde Caron, Hugo Touvron, Ishan Misra, Hervé Jégou, Julien Mairal, Piotr Bojanowski, and Armand Joulin. Emerging properties in self-supervised vision transformers. In *Proceedings of the IEEE/CVF International Conference on Computer Vision*, pages 9650-9660, 2021, each incorporated herein by reference in their entirety. In DINO's method, a student network is created to predict the teacher network results to simplify the self-supervised training process for methods that (originally) require centralized training and decentralized inference. Xu et al. describes a consensus learning approach for cooperative multi-agent reinforcement learning in which different agents can infer the same consensus in discrete spaces without communication. Counterfactual multi-agent (COMA) policy gradients have been proposed. See Jakob Foerster, Gregory Farquhar, Triantafyllos Afouras, Nantas Nardelli, and Shimon Whiteson. Counterfactual multi-agent policy gradients, 2017, incorporated herein by reference in its entirety. An architecture with a centralized critic to estimate the action-value function and decentralized actors to learn the optimal policy for each agent is described. The main innovation in this approach is introducing a counterfactual baseline that allows each agent to compare its current action contribution to the global reward with all the other possible actions. This is a way to deal with the problem of credit assignment in the multi-agent context, which means that the agents do not consider their contribution to a collaborative objective.

Accordingly, it is one object of the present disclosure to provide methods and systems for minimization of the carbon footprint using a multi-agent learning process that takes into account components and conditions of an energy grid such as a microgrid having associated loads (demand) and energy sources (supply) where the agents function to transfer energy between supply and demand while concurrently minimizing carbon footprint. Household agents use a greedy policy that minimizes their own energy costs with minimal communication with other household agents.

SUMMARY

An aspect of the present disclosure is a hierarchical transactive energy control system for controlling a plurality of microgrids, that can include a distributor agent distributing electric power among the plurality of microgrids by facilitating energy trading among the microgrids and minimizing carbon footprint by setting buy and sell prices among the plurality of microgrids; a plurality of microgrid agents for respective ones of the plurality of microgrids, wherein each microgrid agent controls a plurality of households and is configured to access energy available at other microgrids or provide energy to other said microgrids; and a plurality of household agents for controlling respective ones of the plurality of households, wherein at least one active consumer household includes a renewable energy source.

A further aspect of the present disclosure is a method for transactive energy control in a hierarchical multi-agent control system, the hierarchical control system comprising a household layer, a microgrid layer, and a distributor layer, wherein the household layer includes a plurality of household agents, the microgrid layer includes a plurality of microgrid agents, and the distributor layer includes a distributor agent, the method can include controlling, by each household agent, charging and discharging of respective household batteries and household load, when energy in the household layer is in a shortage state, import energy from external power grid, and when energy in the household layer is in a surplus state, export energy to the external power grid, in a manner that energy imported and energy exported is minimized; maximizing, by a microgrid agent, use of local energy in the microgrid based on a pricing policy for local transactions, when a microgrid is in an energy shortage state such that its local energy is insufficient to cover internal demand, access energy in other miocrogrids, when a microgrid is in an energy surplus state such that distributed generation surpasses the internal demand, sell energy to other microgrids experiencing a shortage.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION

Figure 1:
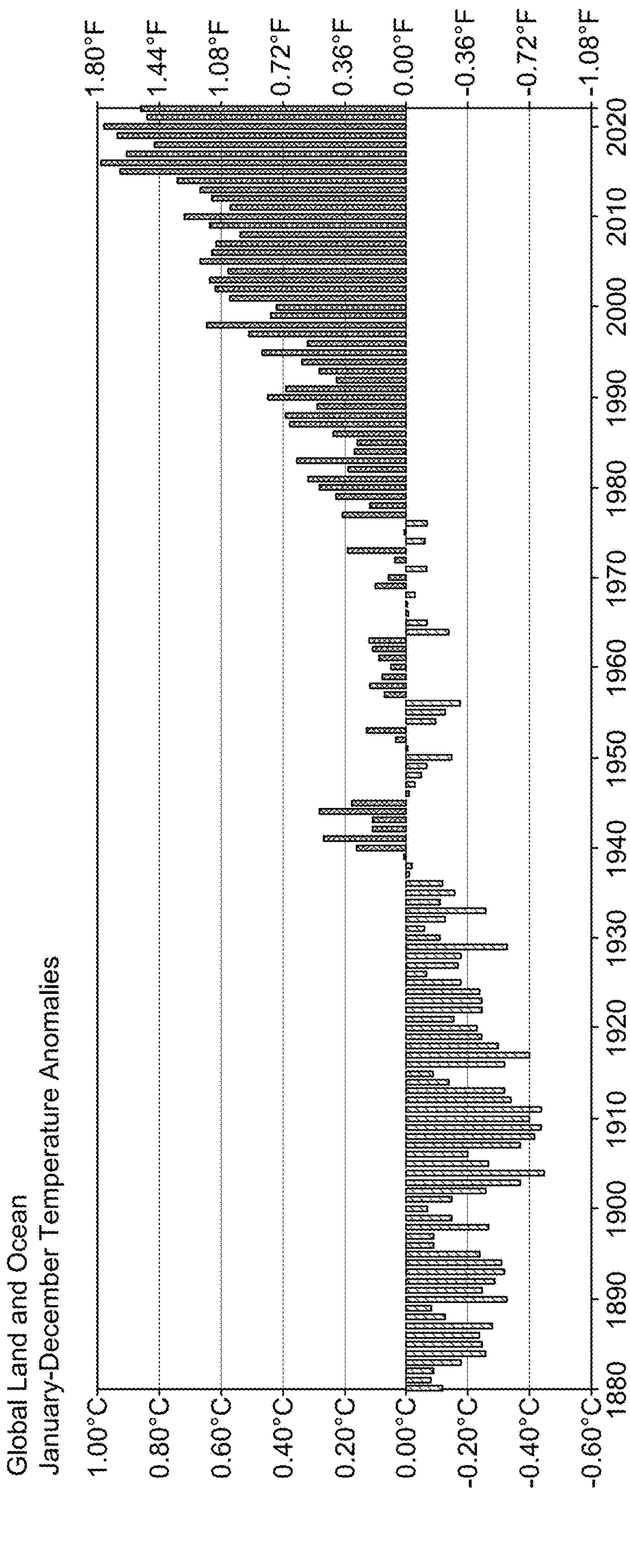
FIG. 1 is a histogram of temperature anomalies since 1880.
Figure 2:
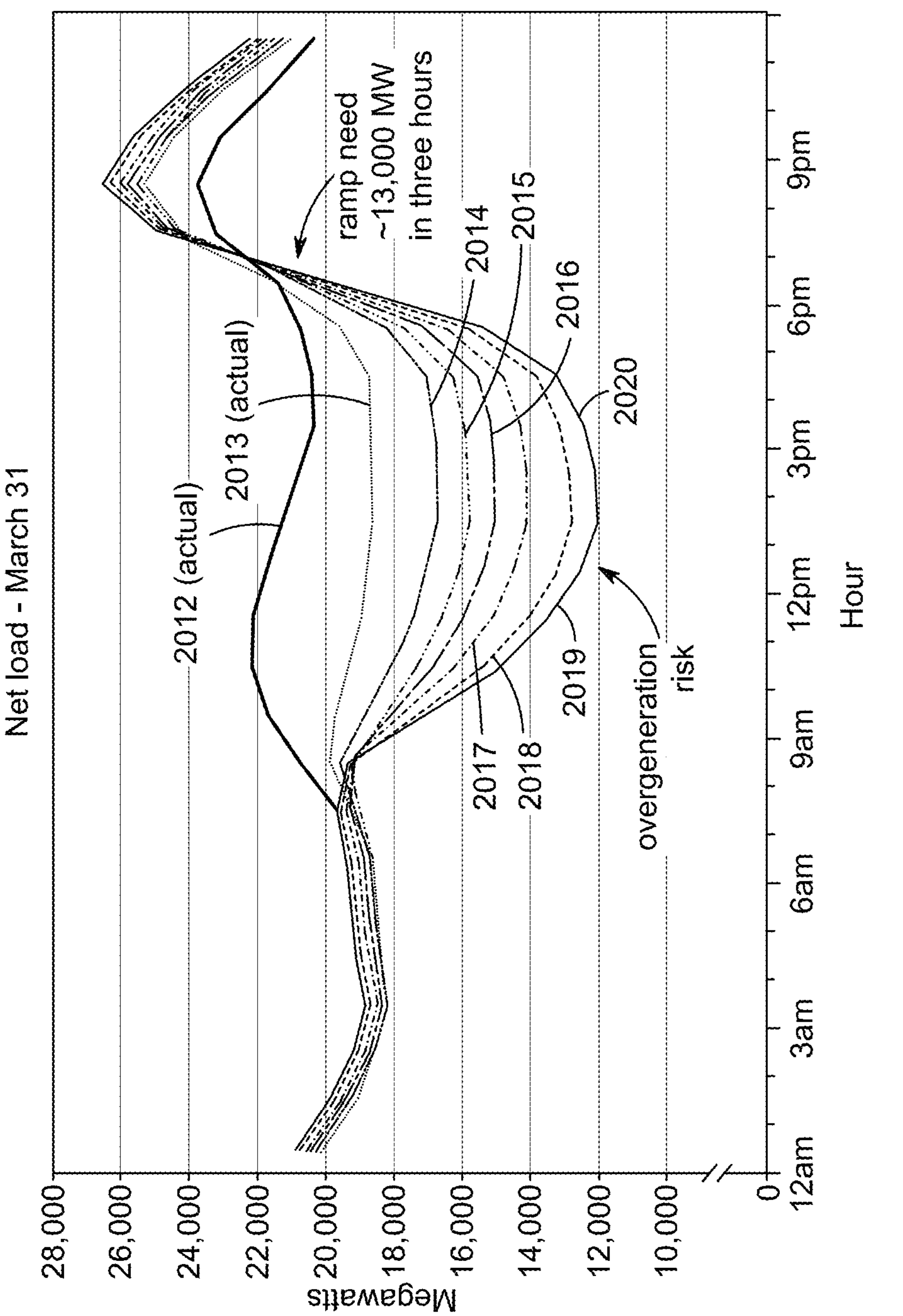
FIG. 2 is a graph for an example overgeneration condition, known as the duck curve.
Figure 3:
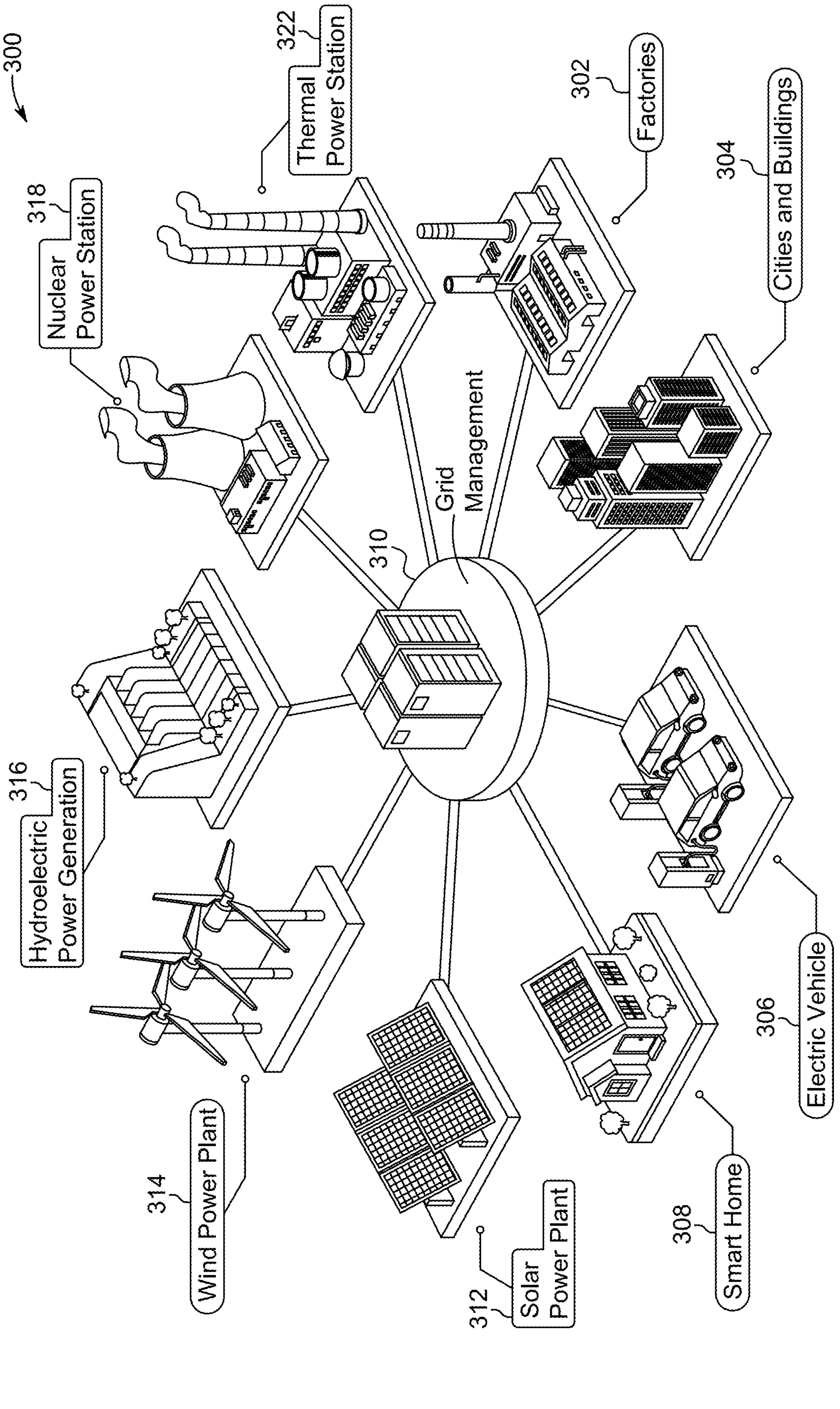
FIG. 3 illustrates a smart grid.
Figure 4:
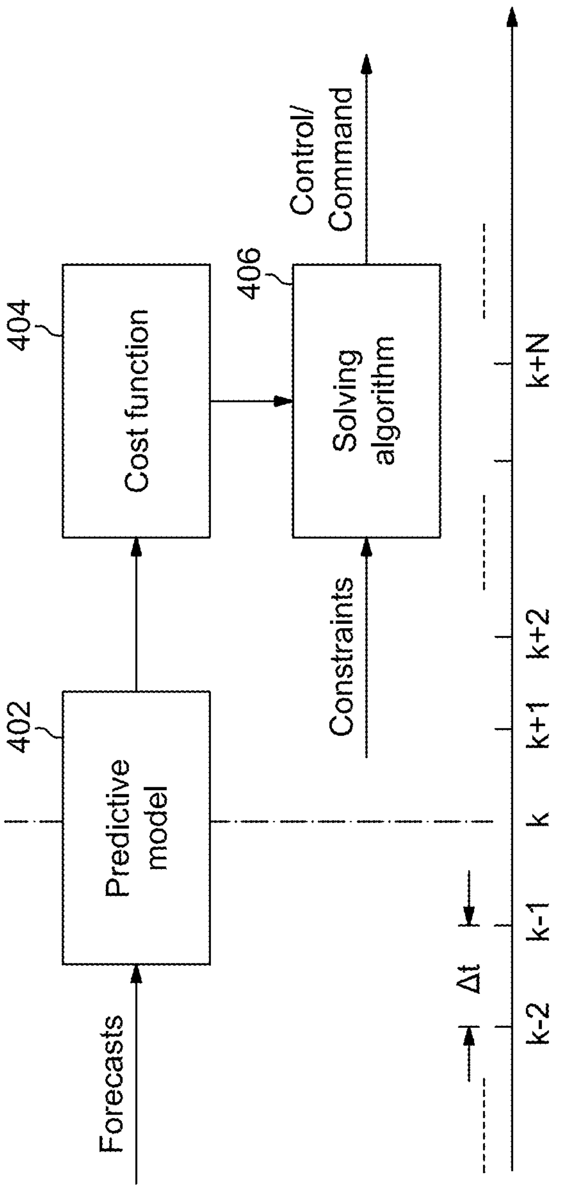
FIG. 4 is a block diagram of an overview of a MPC controller.
Figure 5:
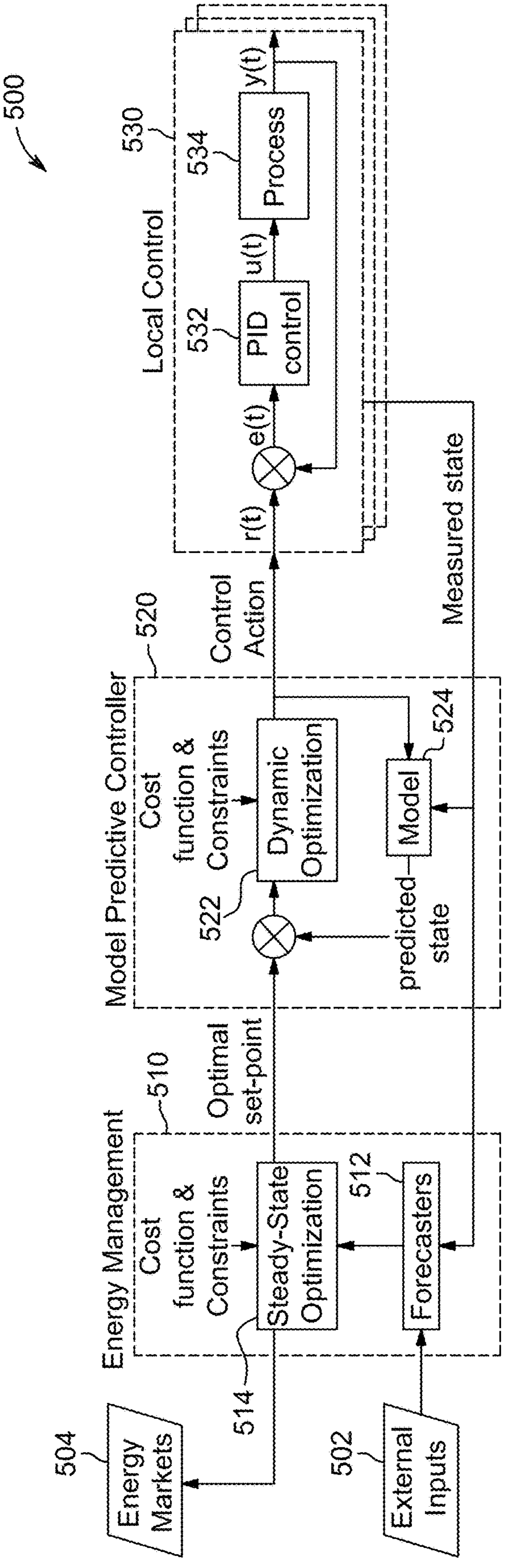
FIG. 5 is a flow diagram of a MPC control approach for grid management.
Figure 6:
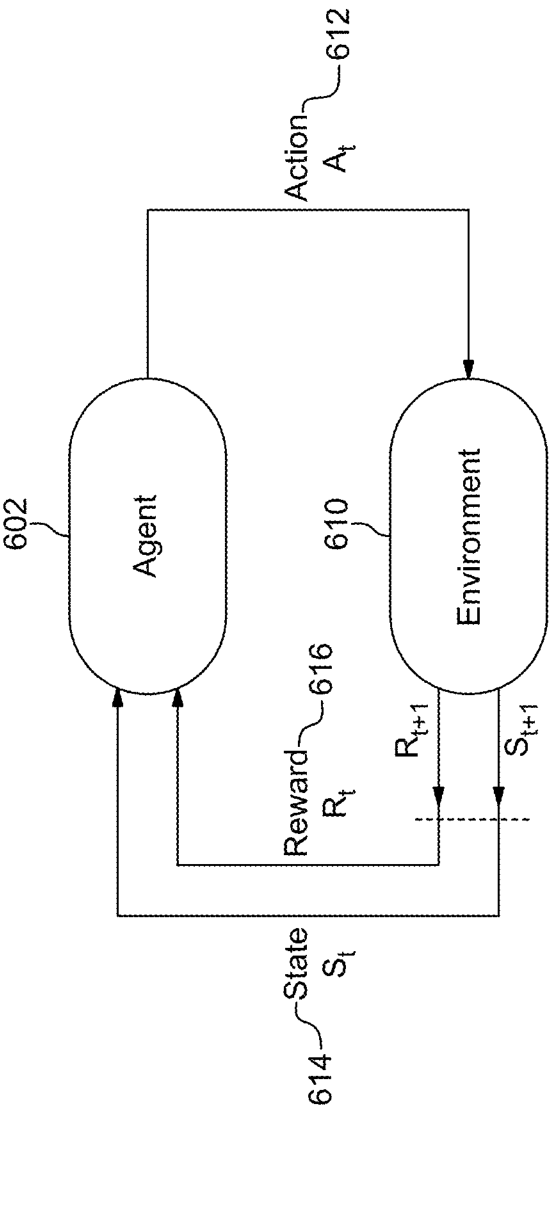
FIG. 6 illustrates a basic Reinforcement Learning arrangement.

In the drawings, like reference numerals designate identical or corresponding parts throughout the several views. Further, as used herein, the words "a," "an" and the like generally carry a meaning of "one or more," unless stated otherwise. The drawings are generally drawn to scale unless specified otherwise or illustrating schematic structures or flowcharts.

Aspects of this disclosure are directed to a system and method for managing microgrids having renewable energy sources, and in particular a multi-agent reinforcement learning framework for managing energy transactions in microgrids and managing the microgrids in a manner that minimizes carbon footprint. The system and method are transactive in that the management of energy transactions is by way of trading/exchanging energy between microgrids.

Certain terms used throughout this disclosure are summarized below.

Battery storage, or battery energy storage systems (BESS), are devices that enable energy (e.g., electricity) from renewable sources, like solar and wind, to be stored and then released in response to demand when the power is needed.

Distributed Energy Resources (DER) are small-scale electricity supply or demand resources that are interconnected to the electric grid. They are power generation resources and are usually located close to load centers and can be used individually or in aggregate to provide value to the grid.

Federated Learning (FL) aims at training a machine learning algorithm, for instance deep neural networks, on multiple local datasets contained in local nodes without explicitly exchanging data samples. The general principle includes training local models on local data samples and exchanging parameters (e.g., the weights and biases of a deep neural network) between these local nodes at some frequency to generate a global model shared by all nodes.

Federated Reinforcement Learning (FRL) enables multiple actors to build a common, robust machine learning model without sharing data, thus addressing critical issues such as data privacy, data security, data access rights and access to heterogeneous data.

A microgrid (MG) is a small network of electricity users with a local source of supply that is usually attached to a centralized national grid but is able to function independently, e.g., as a single controllable entity. Microgrids that include households typically range is size from 100 kW to 10 MW.

Reinforcement Learning (RL), as is known in the art, is about learning the optimal behavior in an environment to obtain maximum reward. This optimal behavior is learned through interactions with the environment and observations of how it responds.

State of Charge (SoC) is the level of charge of an electric battery relative to its capacity. SoC is usually expressed as percentage.

Time of Use (ToU) is the time of day that electricity is being used.

Renewable Energy Sources (RES) include wind, solar, hydropower, geothermal, biofuel, that are naturally replenished and preferably do not run out.

The local source of energy for a microgrid (MG) is renewable energy supplied to a battery energy storage system (BESS). Types of renewable energy include solar, wind, tidal, hydropower, and bio-energy. Renewable energy is inherently stochastic, as it depends on multiple climate factors. As mentioned above, an alternative to model predictive control that can adapt to the randomness of renewable energy is to control energy systems by machine learning models. Although multi-agent reinforcement learning approaches have been used for similar issues, a multi-agent approach still needs to consider carbon footprint in order to address the challenges of climate change. A disclosed solution is a multi-agent hierarchical framework for transactive control of microgrids.

Numerous reinforcement learning approaches have been developed. In determining which reinforcement learning approach to implement, consideration has been given as to the effect of the integration of stochastic DER, such as solar panels, on the performance of the learning algorithms in MG control. A criterion is that the learning approach must be configured to optimize the control of MGs in situations where different stakeholders have different objectives. Another criterion is that the learning agent must be configured to use dynamic pricing strategies to influence demand patterns and generation in an MG to minimize its $CO_2$ emissions.

Figure 7:
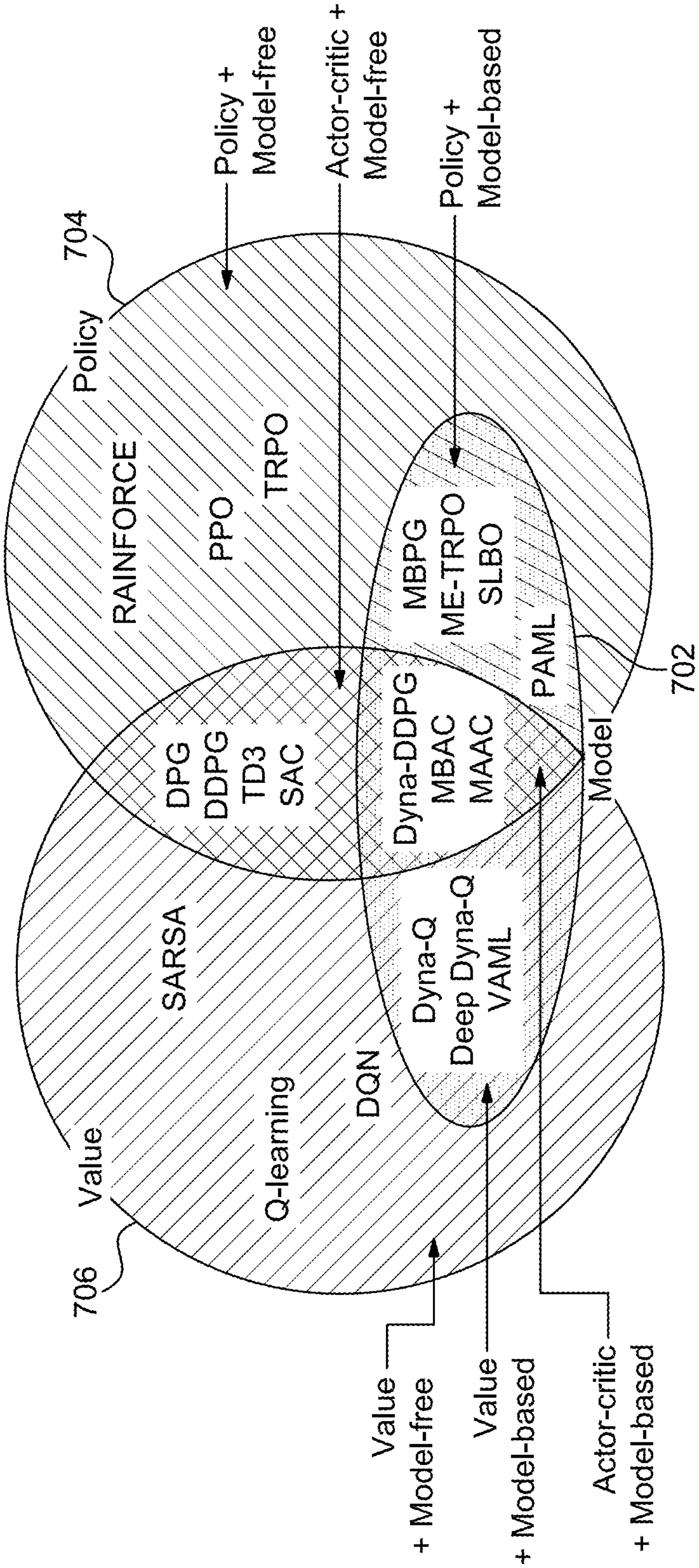
FIG. 7 is a Venn diagram that shows approaches to implement a reinforcement learning algorithm.

Various reinforcement learning approaches have evolved from some of the original value-based approaches, to include a policy and a model. FIG. 7 is a Venn diagram that groups approaches to implement a reinforcement learning algorithm. See Silver, David, UCL course on RL, 2015, www0. cs. ucl. ac. uk/staff/d. silver/web/Teaching. html URL www. youtube. com/playlist. Three groups of approaches to implement reinforcement learning algorithms include Value-based 706, Policy-based 704 and Model-based 702. A Policy-based reinforcement learning method involves a policy that the action performed in every state helps to gain maximum reward in the future. Two types of policy-based methods are deterministic and stochastic. In deterministic methods, for any state, the same action is produced by the policy. In stochastic methods, every action has a certain probability, which is determined by a stochastic policy. In a value-based reinforcement learning method, the model tries to maximize a value function. The agent is expecting a long-term return of the current states under a policy. In a model-based reinforcement learning method, the model is a virtual model for each environment. The agent learns to perform in that specific environment.

The overlap of Policy-based and Value-based includes an Actor-critic that is model-free. An overlap of Policy and Model includes a Policy-based and model-based. A Value-based category itself is a Value and Model-free. An overlap of Value-based and Model-based is Value and Model-based. An Actor-critic and Model-based approach is in a classification that is an overlap of Value-based, Model-based, and Policy-based.

Methods

Figure 8:
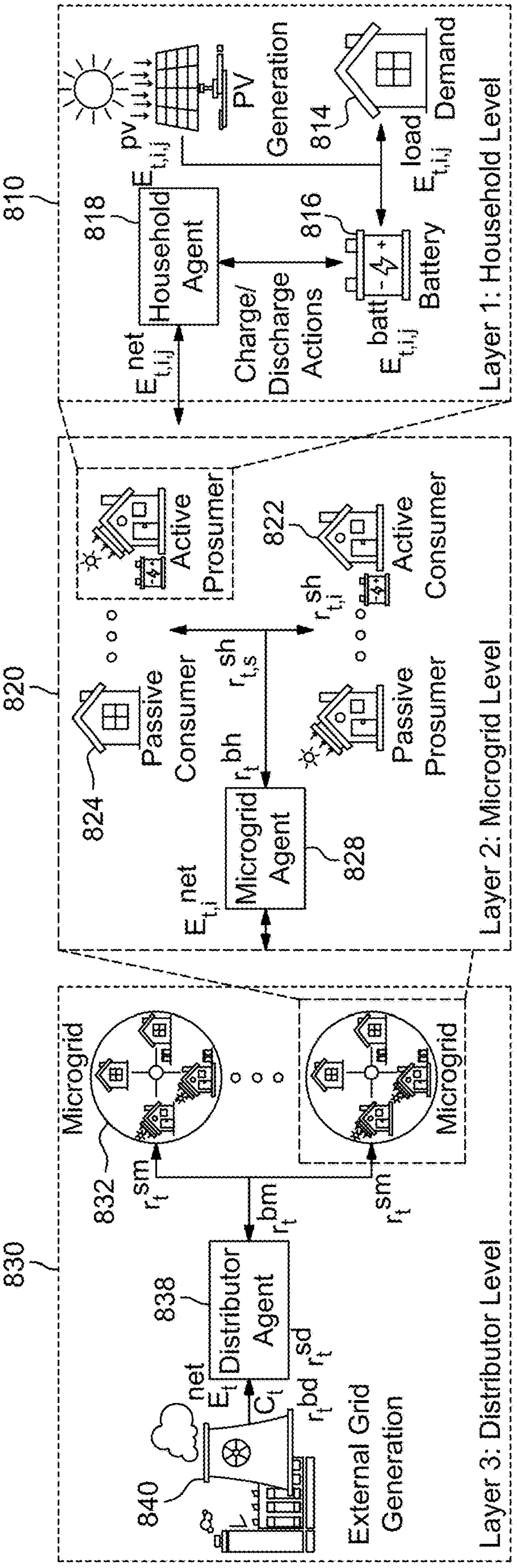
FIG. 8 illustrates a reinforcement learning approach that has a three-layer hierarchical RL architecture, in accordance with an exemplary aspect of the disclosure.

A RL approach that can achieve these objectives has a three-layer hierarchical RL architecture, as shown in FIG. 8. Each layer has its own set of agents, each set with different objectives, pursued greedily. In other words, each layer gives priority to pursuing its own objectives. In this framework, a set of G microgrids 832 is denoted as $M=\{m_1, m_2, \ldots m_i, \ldots m_G\}$; a group of $D_i$ households 822, 824 belonging to a microgrid i is denoted as $H_i=\{h_{i,1}\ h_{i,2}\ \ldots, h_{i,j}\ \ldots, h_{i,D_i}\}$, the current time step is denoted as t.

1. First Layer: Household

In the household layer 810, there are four different cases: 1) households that have no access to any energy asset being only able to consume ("passive consumers" 824); 2) households that have access to photovoltaic panels to produce electricity during day-hours ("passive prosumers"); 3) prosumer households that have access to batteries which allow them to have energy dispatch capabilities ("active prosumers"); and 4) consumer households who also have access to photovoltaic panels as well as energy storages which provide them the potential to sell surplus energy back to the microgrid ("active consumers" 822). Households without batteries ("passive consumers" or "passive prosumers") do not need to execute control actions as they do not have such capabilities to react to energy fluctuations (e.g., due to climate change changes). In contrast, those "actionable" agents 818 (active prosumers, active consumers) can take action to charge and discharge the batteries 816 and can affect the demand and supply in the microgrid. Based on the above logic, the equations of this layer are as follows:

$$E^{st}_{t,i,j} = E^{imp_1}_{t,i,j} + E^{imp_2}_{t,i,j} + E^{imp_3}_{t,i,j} \tag{1}$$

-continued $$E_{t,i,j}^{sp} = E_{t,i,j}^{exp_1} + E_{t,i,j}^{exp_2} + E_{t,i,j}^{exp_3} \quad (2)$$

$$E_{t,i,j}^{net} = E_{t,i,j}^{st} - E_{t,i,j}^{sp} = E_{t,i,j}^{load} - E_{t,i,j}^{pv} \pm E_{t,i,j}^{batt} \quad (3)$$

TABLE 1

Table of defined symbols

| | L1: Household | L2: Microgrid | L3: Distribution | Type | Unit |
|---|---|---|---|---|---|
| Net | $E_{t,i,j}^{net}$ | $E_{t,i}^{net}$ | $E_t^{net}$ | Energy | Wh |
| Demand | $E_{t,i,j}^{load}$ | | | Energy | Wh |
| PV Gen | $E_{t,i,j}^{pv}$ | | | Energy | Wh |
| Battery | $E_{t,i,j}^{batt}$ | | | Energy | Wh |
| Shortage | $E_{t,i}^{st}$ | $E_{t,i}^{st}$ | $E_t^{st}$ | Energy | Wh |
| Surplus | $E_{t,i,j}^{sp}$ | $E_{t,i}^{sp}$ | $E_t^{sp}$ | Energy | Wh |
| L1 Import | $E_{t,i,j}^{imp_1}$ | | | Energy | Wh |
| L1 Export | $E_{t,i,j}^{exp_1}$ | | | Energy | Wh |
| L2 Import | $E_{t,i}^{imp_2}$ | $E_{t,i}^{imp_2}$ | | Energy | Wh |
| L2 Export | $E_{t,i,j}^{exp_2}$ | $E_{t,i}^{exp_2}$ | | Energy | Wh |
| L3 Import | $E_{t,i,j}^{imp_3}$ | $E_{t,i}^{imp_3}$ | $E_t^{imp_3}$ | Energy | Wh |
| L3 Export | $E_{t,i,j}^{exp_3}$ | $E_{t,i}^{exp_3}$ | $E_t^{exp_3}$ | Energy | Wh |
| Emision | — | — | $C_t$ | GHG | $CO_2$/Wh |
| Sell | $r_{t,i}^{sh}$ | $r_t^{sm}$ | $r_t^{sd}$ | Price | $/Wh |
| Buy | $r_{t,i}^{bh}$ | $r_t^{bm}$ | $r_t^{bd}$ | Price | $/Wh |

Where "st" is shortage and "sp" is surplus. In the case of consumer households with no photovoltaic panel (passive consumers), the generation $$E_{t,i,j}^{pv} = 0.$$

When $$E_{t,i,j}^{net} \geq 0$$

(called "shortage" state), it means there is extra energy needed from external sources (e.g., retailers or other households). When $$E_{t,i,j}^{net} < 0$$

(called "surplus" state), there is surplus energy available to sell back to the external power grid or other households in shortage. The equation (3) presents a constraint that should be satisfied as it is impossible to have both scenarios simultaneously. Finally, the objective function of this layer is:

$$\min \begin{cases} E_{t,i,j}^{imp_3}\left(r_t^{sd} + c_t\right) + E_{t,i,j}^{imp_2} r_{t,k}^{sm} + E_{t,i,j}^{imp_1} r_{t,i}^{sh} & \text{, if } E_{t,i,j}^{net} \geq 0, \\ E_{t,i,j}^{exp_3} r_t^{bd} + E_{t,i,j}^{exp_2} r_t^{bm} + E_{t,i,j}^{exp_1} r_{t,i}^{bh} & \text{, if } E_{t,i,j}^{net} < 0 \end{cases}. \quad (4)$$

The objective function is a greedy function. Each household agent takes actions to maximize its own rewards, i.e., seeks to minimize cost of energy usage by prioritizing utilization of its own batteries for its energy. At the same time, a household agent is rewarded by sale of energy to other households in a microgrid.

Household Agent 818 (State, Action, Reward):

Households 812 can obtain energy from a renewable energy source, e.g., photovoltaic cells 814, or batteries 816. The household agent 818 maintains a state, based on the battery state of charge, $$\{t, B^{soc}_{t,i,j}\}$$

and performs an action, $$E^{batt}_{t,i,j} \in [-B^{dch.max}_{i,j}, B^{ch.max}_{i,j}]$$

including a range of fully discharging a battery to fully charging a battery.

The reward is reflected in a solution of the objective function (4) in terms of a price for selling energy to other households in the microgrid in the face of utilizing its own energy from renewable sources.

2. Second Layer: Microgrid

In the second layer 820, a microgrid agent defines the sell price $$r^{sh}_{t,i}$$

and the buy price $$r^{bh}_{t,i}$$

for energy exchange between households. Its objective is greedy as the layer maximizes the use of local energy within a microgrid by defining the pricing policy for local transactions. The objective is represented as the following equations:

$$E^{st}_{t,i} = E^{imp2}_{t,i} + E^{imp3}_{t,i},\ E^{imp2}_{t,i} = \sum_j E^{imp2}_{t,i,j},\ E^{imp3}_{t,i} = \sum_j E^{imp3}_{t,i,j}, \tag{5}$$

$$E^{sp}_{t,i} = E^{exp2}_{t,i} + E^{exp3}_{t,i},\ E^{exp2}_{t,i} = \sum_j E^{exp2}_{t,i,j},\ E^{exp3}_{t,i} = \sum_j E^{exp3}_{t,i,j}, \tag{6}$$

$$E^{net}_{t,i} = E^{sp}_{t,i} - E^{st}_{t,i}. \tag{7}$$

Where "st" is shortage and "sp" is surplus. A microgrid will experience an (energy) shortage state when the local energy is insufficient to cover the internal demand and will experience an (energy) surplus state when the distributed generation surpasses the internal demand. In the first case, a microgrid could access energy available in other microgrids. In the second case, it could sell energy to other microgrids experiencing a shortage. If energy is unavailable/over-produced at the current microgrid layer, it will be imported or exported to the third layer. With this, the second layer's objective function is represented as the following equation:

$$\min\begin{cases} E^{imp3}_{t,i}(r^{sd}_t + c_t) + E^{imp2}_{t,i} r^{sm}_t, & \text{if } E^{net}_{t,i} \geq 0, \\ E^{imp3}_{t,i} r^{bd}_t + E^{imp2}_{t,i} r^{bm}_t, & \text{if } E^{net}_{t,i} < 0. \end{cases} \tag{8}$$

Microgrid Agent 828 (State, Action, Reward):

In a microgrid, each home is electrically interconnected to each other and has independent and different load profiles and DERs. When a microgrid is in shortage, it can access energy available in neighboring microgrids.

The microgrid agent 828 maintains a state of energy storage or energy surplus, $$\{t, E^{sp}_{t,i}, E^{st}_{t,i}\}$$

and performs an action utilizing energy locally, accessing energy from other microgrids or selling energy to other microgrids, the parameters $$\alpha_i \in [0, 1]\quad \beta_i \in [0, 1]$$

define the internal microgrid price in a linear function that depends on the offer and the demand respectively.

The reward is reflected in a solution of the objective function (8) for utilizing local energy that includes energy from renewable sources and selling energy to other microgrids.

2.3 Third Layer: Distributor

In the third layer 830, the distributor agent tries to shape the overall load among the multiple microgrids 832, encouraging energy trading and simultaneously minimizing the carbon emission by setting the buy $$(r^{bm}_t)$$

and sell $$(r^{sm}_t)$$

prices of energy exchange between the microgrids 832. The prices for selling energy $$(r^{sd}_t)$$

and accepting surplus $$(r^{bd}_t)$$

from the microgrids are not controlled in this layer and are treated as external inputs (from the second layer). To define the objective function of the distributor, the following is first defined:

$$E^{st}_t = E^{imp3}_t = \sum_i E^{imp3}_{t,i} \tag{9}$$

$$E^{sp}_t = E^{exp3}_t = \sum_i E^{exp3}_{t,i} \tag{10}$$

$$E^{net}_t = E^{st}_t - E^{sp}_t = E^{imp3}_t - E^{exp3}_t \tag{11}$$

Where "st" is shortage and "sp" is surplus. Then, the distributor's objective function is defined as follows:

$$\min\begin{cases} E^{imp3}_t(r^{sd}_t + c_t), & \text{if } E^{net}_t \geq 0, \\ E^{imp3}_t r^{bd}_t, & \text{if } E^{net}_t < 0. \end{cases} \tag{12}$$

In addition, in an exemplary embodiment there is only one distributor and the energy consumed within or between microgrids has negligible carbon impact. A simple local energy market can be implemented based on the physical distance between the household and the microgrids.

Distributor Agent 838: (State, Action, Reward):

A Distributor has several customers aggregated in microgrids. The objective of the distributor agent at this level is to minimize its costs while maintaining the grid's stability.

The distributor agent 838 maintains a state of energy storage or energy surplus, $$\{t, E^{sp}_{t,i}, E^{st}_{t,i}\}$$

and performs an action, $$\alpha \in [0, 1]\ \beta \in [0, 1]$$

Which defines the microgrid trading price depending on the offer and the demand respectively. Of supplying energy to the grid. The reward is reflected in a solution of the objective function (12) which includes minimizing energy supply from non-renewable energy sources.

Results and Analysis

1. Experimental Setup

The environment (in OpenAI Gym) is configured to present different sets of households for training, validation, and testing. Detail about the precise attributes of the dataset is present below. A conventional approach uses a multi-agent cooperative reinforcement learning framework that can explicitly guide agents to make cooperative decisions in decentralized execution.

The environment supports the addition of noise to the dataset to increase the variance of possible scenarios. This is enabled by default; however, it is possible to deactivate this option to make reproducibility of experiments easier.

2. Model Performance

A performance metric is based on how energy cost and carbon impact are improved by optimally managing distributed storage. The metric measures a scenario without batteries and one with the disclosed hierarchical control. Each household contributes to the metric individually, and the upper levels aggregate them to have microgrid-level and distributor-level performance.

Table 2 presents empirical results comparing the optimal solution for a scenario using a linear solver (CVXPY), the disclosed framework, and COMA, which is considered a state-of-the-art MARL algorithm. One of the things to highlight about the disclosed approach is its training speed and simplicity versus COMA, which is very sensitive to hyperparameter tuning. The present framework reached solutions very close to the optimal within a reasonable training time.

TABLE 2

Average performance of households. Lower is better for all except reward.

| | CVXPY | MAHTM | COMA |
|---|---|---|---|
| Train reward | −0.915 | −0.993 | −1.3 |
| Train price score | −0.103 | −0.097 | 0.35 |
| Train emission score | −0.223 | −0.1522 | 0.35 |

TABLE 2-continued

Average performance of households. Lower is better for all except reward.

| | CVXPY | MAHTM | COMA |
|---|---|---|---|
| Train time | 0.9 s | 10 m | 2 h |
| Test price score | −0.0889 | −0.064 | 0.0625 |
| Test emission score | −0.19 | −0.097 | 0.0625 |

In summary, the disclosed framework systematically applies the MARL technique on transactive microgrids. The results are compared with one classic MARL algorithm. A customized OpenAI Gym environment is also created to serve as the test bench. The disclosed framework can help accelerate the implementation of local renewable energy markets, fostering emission reduction and more consumer engagement.

The following is a detailed discussion of aspects of the present invention.

Algorithms

First layer: Policy Gradient (PG), Advantage Actor-Critic (A2C)

Figure 9:
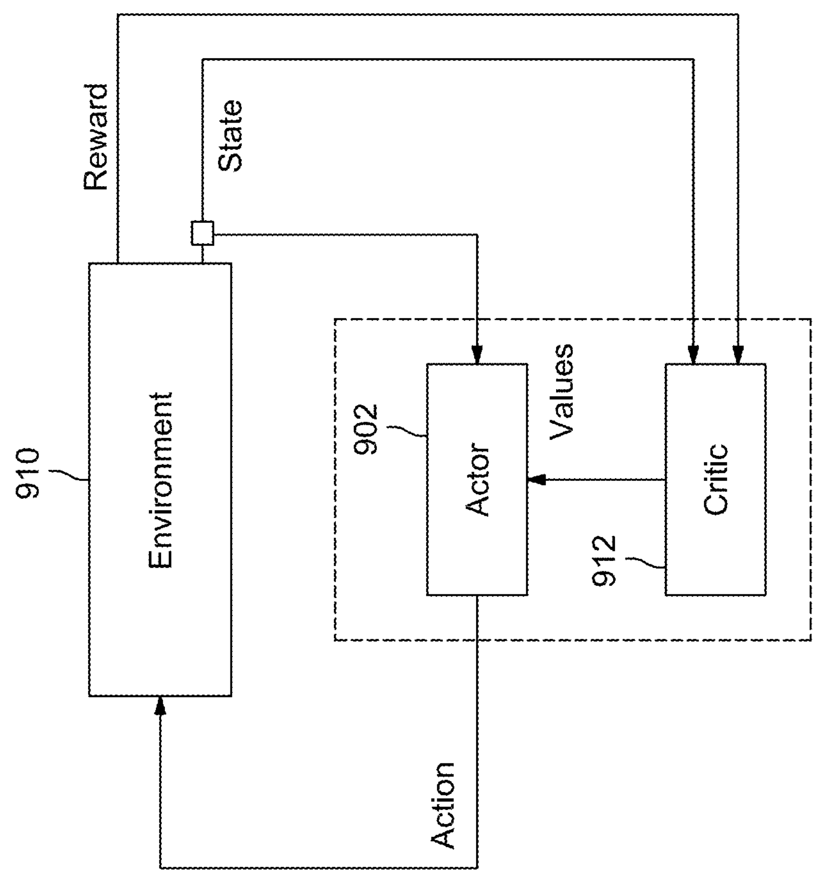
FIG. 9 is a flow diagram of the Advantage Actor-Critic approach to implementing reinforcement learning, in accordance with an exemplary aspect of the disclosure.

FIG. 9 is a flow diagram of the Advantage Actor-Critic approach to implementing reinforcement learning. See Diederichs, Elmar, Reinforcement Learning-A Technical Introduction, Journal of Autonomous Intelligence, Vol. 2, page 25, 2019. In this approach, the objective of the agent is to maximize the probability of having the trajectories that show the higher sum reward. Defined as:

$$J(\theta) = E_{\pi_\theta}\left[\sum_t \gamma^t r_t\right] \tag{13}$$

It can be understood as the expected sum of the discounted rewards obtained by completing one episode following a defined policy $\pi_\theta$. The factor $\gamma$ helps prevent the sum from going infinite and gives more relevance to the rewards obtained in the short term. The idea of this RL method is to maximize equation (13) using stochastic gradient ascent. By using the definition of expectation, the policy gradient is defined as:

$$\nabla_\theta J(\theta) = E_{\tau\sim\pi_\theta(\tau)}\left[\left(\sum_{t=1}^{T}\nabla_\theta \log \pi_\theta(a_t \mid s_t)\right)\left(\sum_{t=1}^{T} r(s_t, a_t)\right)\right] \tag{14}$$

In A2C, an estimator (a neural network) is used to represent the policy $\pi_\theta(a_t|s_t)$, named Actor 902. The Actor 902 will map the states to the actions and, from this, will learn which are optimal. Its training follows the next steps:

Sample i trajectories $\tau^i$ using the actor policy.

Assuming the policy gradient definition in equation (14).

Updating the weights $\theta$ of the policy as follows: $\theta \leftarrow \theta + a\nabla_\theta J(\theta)$.

Sequentially running multiple trajectories is a long process. For that reason, batch training is generally implemented to speed up the learning of the policy estimator 902. By doing so, the exploration speed increases, modifying the equation 14 as follows:

$$\nabla_\theta J(\theta) \approx \frac{1}{N}\sum_{i=1}^{N}\sum_{t=1}^{T}\left[\nabla_\theta \log \pi_\theta(a^i_t \mid s^i_t)\left(\sum_{t=1}^{T} r(s^i_t, a^i_t)\right)\right] \tag{15}$$

However, by doing so, an issue is added: The variance of $\nabla_\theta J(\theta)$ increases. To help solve this, the Advantage action is introduced. First, start by understanding that the term $$\sum_{t=1}^{T} r(s_t^i, a_t^i)$$

is the empirical value of the Q(s, a) function, as it represents the expected reward can be obtained from doing an action $a_t$ while in state $s_t$. Finding a value V independent of the neural network parameters θ, subtract it from the Q function to re-calibrate the rewards towards the average action. Thus, the advantage function is defined as:

$$A^\pi(s_t, a_t) = Q^\pi(s_t, a_t) - V^\pi(s_t) \quad (16)$$

The algorithm A2C gets its name from the use of the advantage function 16, and the addition of an extra neural network (the Critic 912) that approximates $V^\pi(s_t)$ and will be trained with the experienced $Q^\pi(s_t, a_t)$. In other words, the critic 912 evaluates the actions taken by the actor 902 on the environment 910 and approximates the corresponding values.

Figure 10:
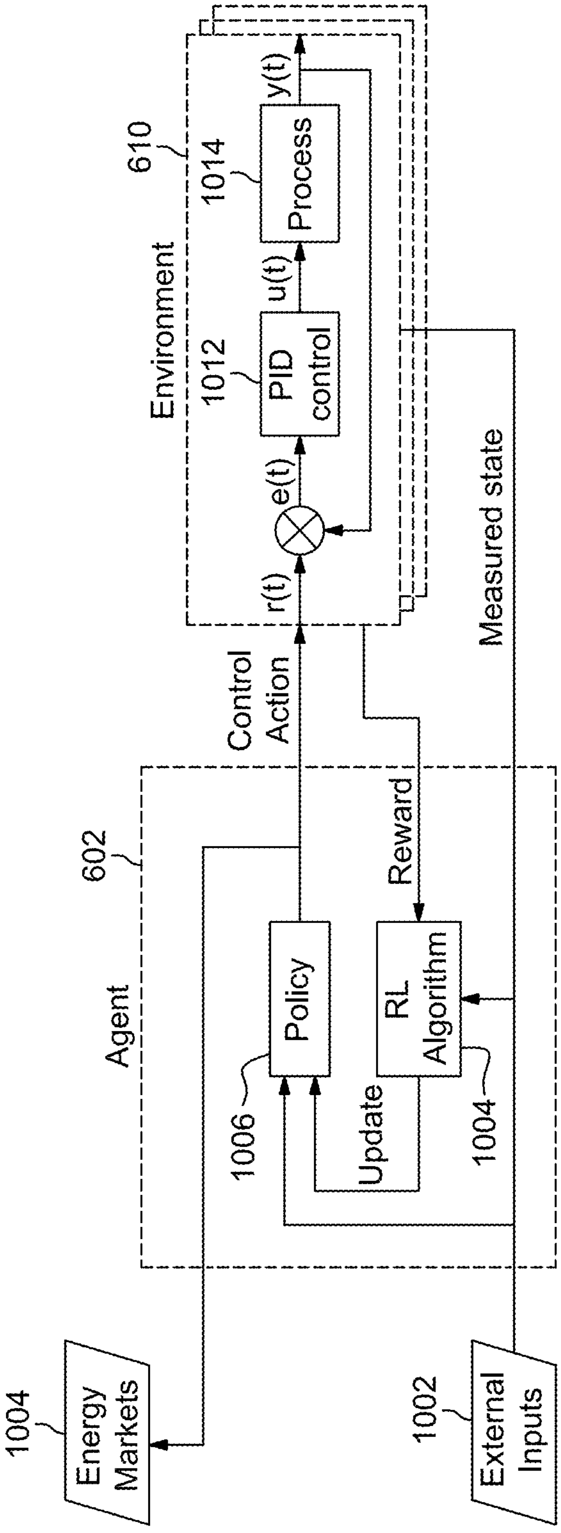
FIG. 10 is a flow diagram of a A2C reinforcement learning control approach for grid management, in accordance with an exemplary aspect of the disclosure.

FIG. 10 is a flow diagram of a A2C reinforcement learning control approach for grid management. The approach 1000 includes an input 1002 to receive external inputs from the smart grid and an output to external markets 1004. The external inputs 1002 are input to a reinforcement learning algorithm 1004. The results of the ML algorithm 1004 are fed to the Policy function 1006. The Policy 1006 produces an optimal control action. The agent 602 takes the optimal control action on the environment 610 to iterate a predicted state. The Agent 602 generates a control action for a number of environments 610. Each environment 610 includes a control function, e.g., PID control 1012, to control a process 1014. A measured state is fed back to the RL algorithm 1004.

Figure 11:
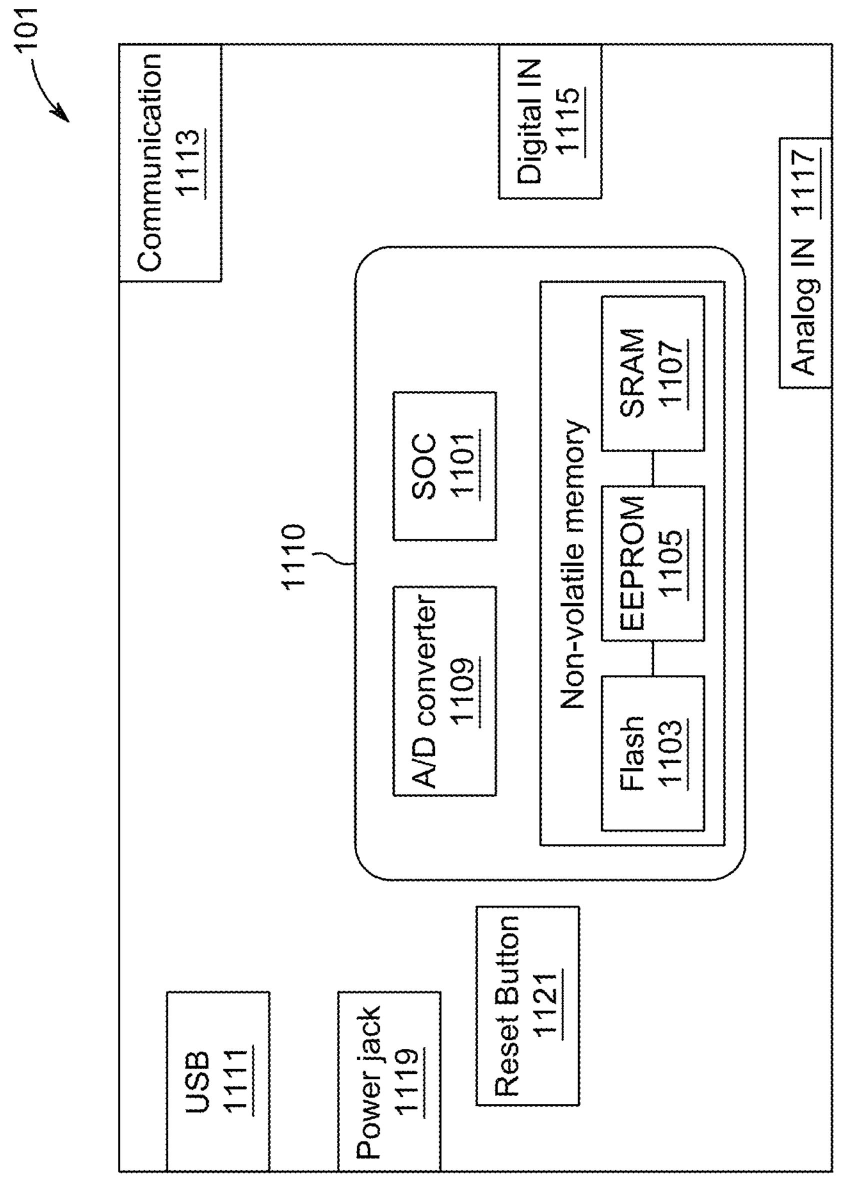
FIG. 11 is a block diagram of a hardware implementation for performing a control approach.

FIG. 11 is a block diagram of a hardware implementation for performing a control approach.

The computer-based control system 101 may be based on a microcontroller. A microcontroller may contain one or more processor cores (CPUs) along with memory (volatile and non-volatile) and programmable input/output peripherals. Program memory in the form of flash, ROM, EPROM, or EEPROM is often included on chip, as well as a secondary RAM for data storage. In one embodiment, the computer-based system 101 is an integrated circuit board 101 with a microcontroller 1110. The board includes digital I/O pins 1115, analog inputs 1117, hardware serial ports 1113, a USB connection 1111, a power jack 1119, and a reset button 1121. It should be understood that other microcontroller configurations are possible. Variations can include the number of pins, whether or not the board includes communication ports or a reset button.

The microcontroller is a 8-bit AVR RISC-based microcontroller having 256 KB flash memory 1103, SRAM 1107, EEPROM 1105, general purpose I/O lines, general purpose registers, a real time counter, six flexible timer/counters, a 16-channel 10-bit A/D converter 1109, and a JTAG interface for on-chip debugging. The microcontroller is a single SOC that achieves a throughput of 16 MIPS at 16 MHz and operates between 4.5 to 5.5 volts. The recommended input voltage is between 7-12V. Although the description is of a particular microcontroller product, it should be understood that other microcontrollers may be used. Microcontrollers vary based on the number of processing cores, size of non-volatile memory, the size of data memory, as well as whether or not it includes an A/D converter or D/A converter.

Multi-Agent RL

Multi-agent RL (MARL) is a way of implementing policy gradients in a multi-agent configuration. In this case, each agent has its actor and critic, interacting with an agent-specific action and observation history. This approach was first introduced with a Q-learning algorithm. See Ming Tan. Multi-agent reinforcement learning: Independent versus cooperative agents. In *International Conference on Machine Learning*, 1993, incorporated herein by reference in its entirety. When using the same principle with an Agent-Critic (AC) algorithm, it is called an Independent Actor-Critic (IAC) as explained in Foerster et al. (2017).

In this approach, all the agents' neural networks can share parameters (global weights for the agents and global weights for the critic). Thus, only one agent and one critic are learned in the end. However, each agent has access to different observations and attributes associated with the household, allowing them to take different actions. Subsequently, the updated shared parameters are broadcast to all agents and critics This method helps RL agents with similar tasks to learn faster and better.

Expanding on the equation (13) for the single-agent case, the equation (17) is the equivalent for the multi-agent case. Where the generalization of the Markov decision process is the stochastic game, the state transitions and the rewards of the agents $r_{i,t+1}$ result from their joint actions.

$$J(\theta) = E\left[\sum_t \gamma^t r_{i,t} \mid x_0 = x, h\right] \quad (17)$$

Experimental Implementation

Using the OpenAI Gym toolkit Brockman et al. (2016) as a wrapper, an experimental implementation uses data generated synthetically. See Greg Brockman, Vicki Cheung, Ludwig Pettersson, Jonas Schneider, John Schulman, Jie Tang, and Wojciech Zaremba. Openai gym, 2016, incorporated herein by reference in its entirety. The experimental implementation standardizes the evaluation of diverse RL agents. The experimental implementation includes stochastic energy generation, agent energy market participation, realistic battery representation, and a diversified set of household demand profiles.

Dataset

Figure 12A:
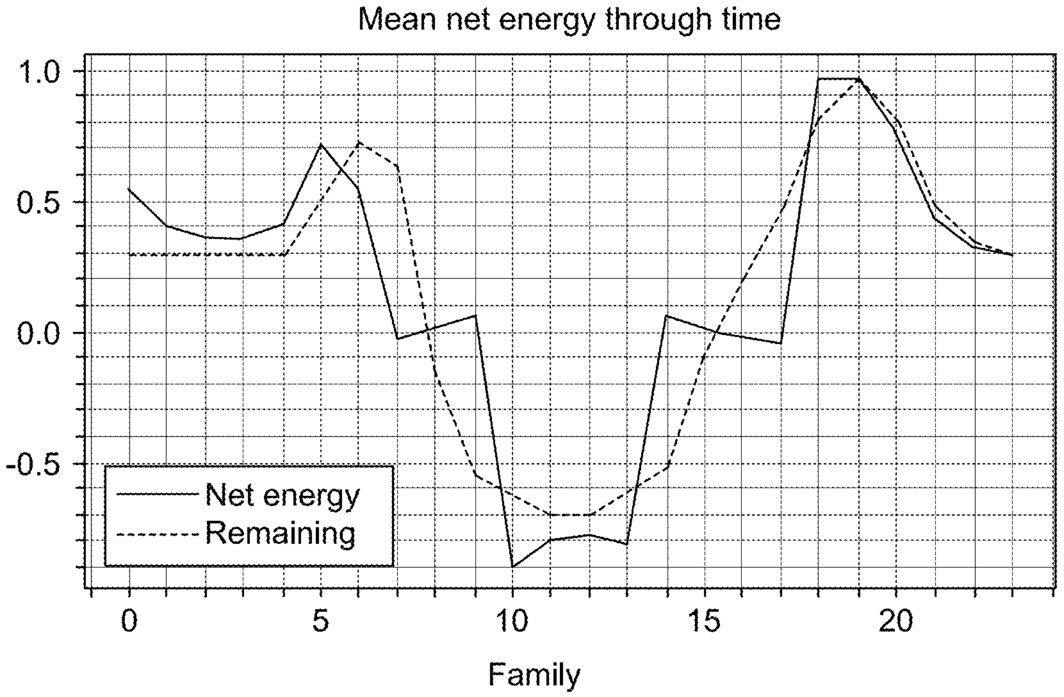
FIGS. 12A-12D illustrate Emissions and Price score comparison between CVXPY solver and A2C in the microgrid for all 3 stages (training, evaluation, and testing)
Figure 12B:
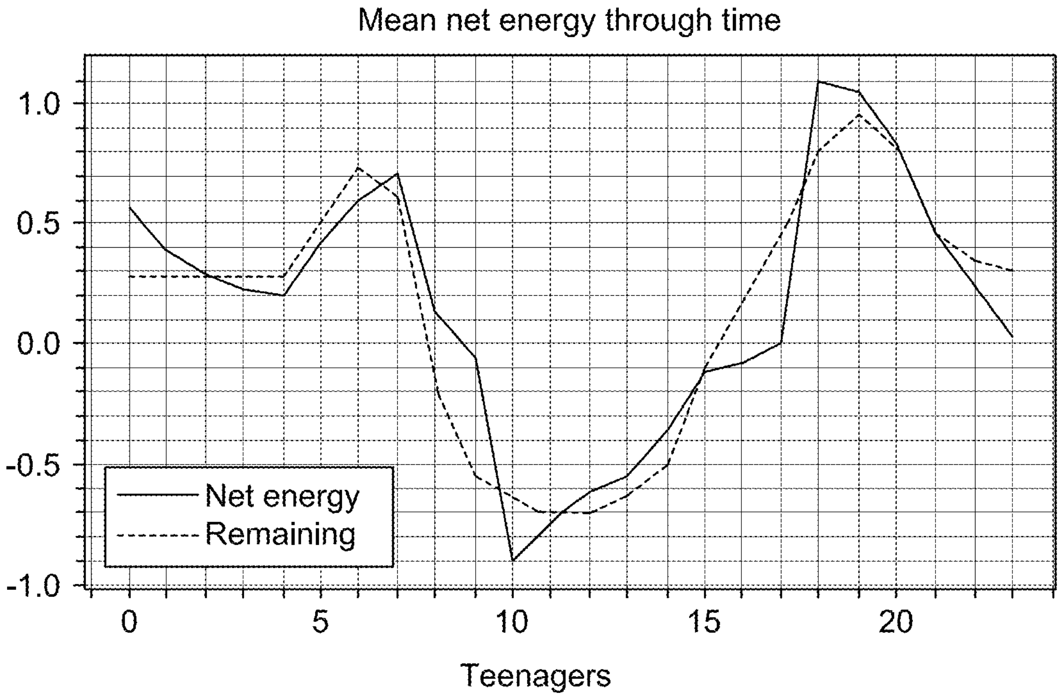
Figure 12C:
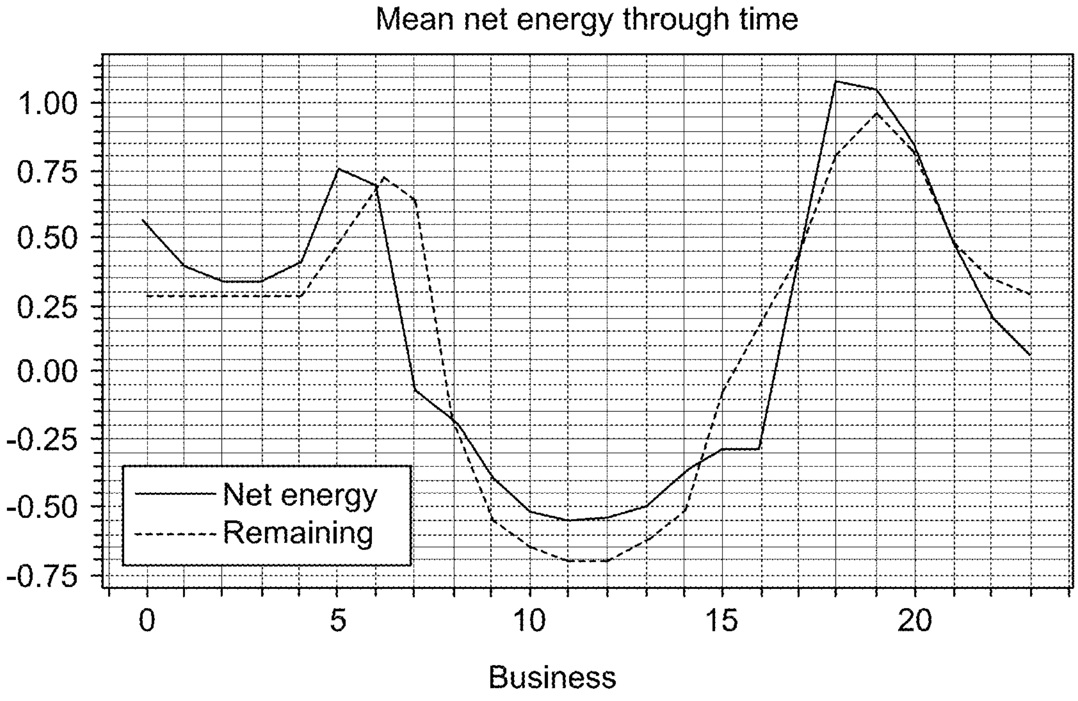
Figure 12D:
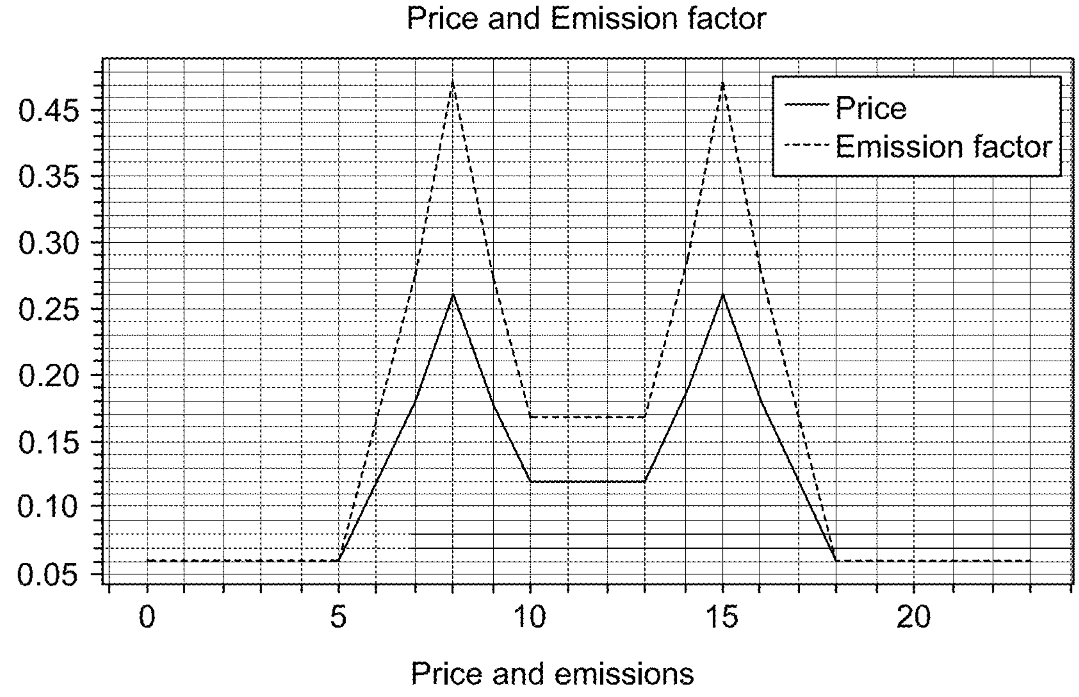

The data used in the experimental implementation is synthetically generated based on real-life data. For this implementation, 24 steps are defined representing the hours within a day, with the possibility of extending to more steps if required. There are three different demand profiles, each representing a specific use: family, with demand peaks in the morning and early afternoon (refer to the trend shown in FIG. 12A); teenagers, with peaks late in the afternoon till early morning (refer to the trend shown in FIG. 12B); house business, with high energy usage in the middle of the day (refer to the trend shown in FIG. 12C). These non-shiftable demands are generated with noise, different energy baselines, and a dependency on stochastic variables such as temperature. Referring to FIG. 12D, grid energy cost and carbon emissions are defined for two different sources, nuclear and gas. Nuclear has a more negligible cost and carbon footprint than gas. Nuclear is a constant for price and emissions since the production is stable but sometimes is not enough to supply all the houses. Hence a decision has been made to produce energy with gas which is more expensive than nuclear energy and emits more carbon emissions.

Dataset Generation

The dataset generated for this experimental implementation has the following parameters (all of them normalized):

- The demand profiles are explained above: family, teenager, business.
- Peak load maximum: The maximum the house can consume.
- PV (photovoltaic) peak generation: The maximum is possible to generate with the solar panels for that house.

Battery Characteristics

- Random state of charge: to decide if the battery will start with a random percentage.
- Capacity: energy capacity of the battery/array of batteries in (kWh) when is not normalized.
- Efficiency: A value between 0 and 1 represents the one-way efficiency of the battery, considering the same efficiency for charging and discharging (%) . . . .
- State of charge (SoC) max and min: Value between 0 and 1 representing the highest value and the lowest the SoC a battery can reach.
- P charge max: Maximum charging rate of a battery (%).
- P discharge Max: Minimum battery charging rate (%).
- Sell Price: Price for injecting energy into the battery (reward to the prosumers).
- Buy price: Price for using energy from the battery ($/kWh).

Figure 13A:
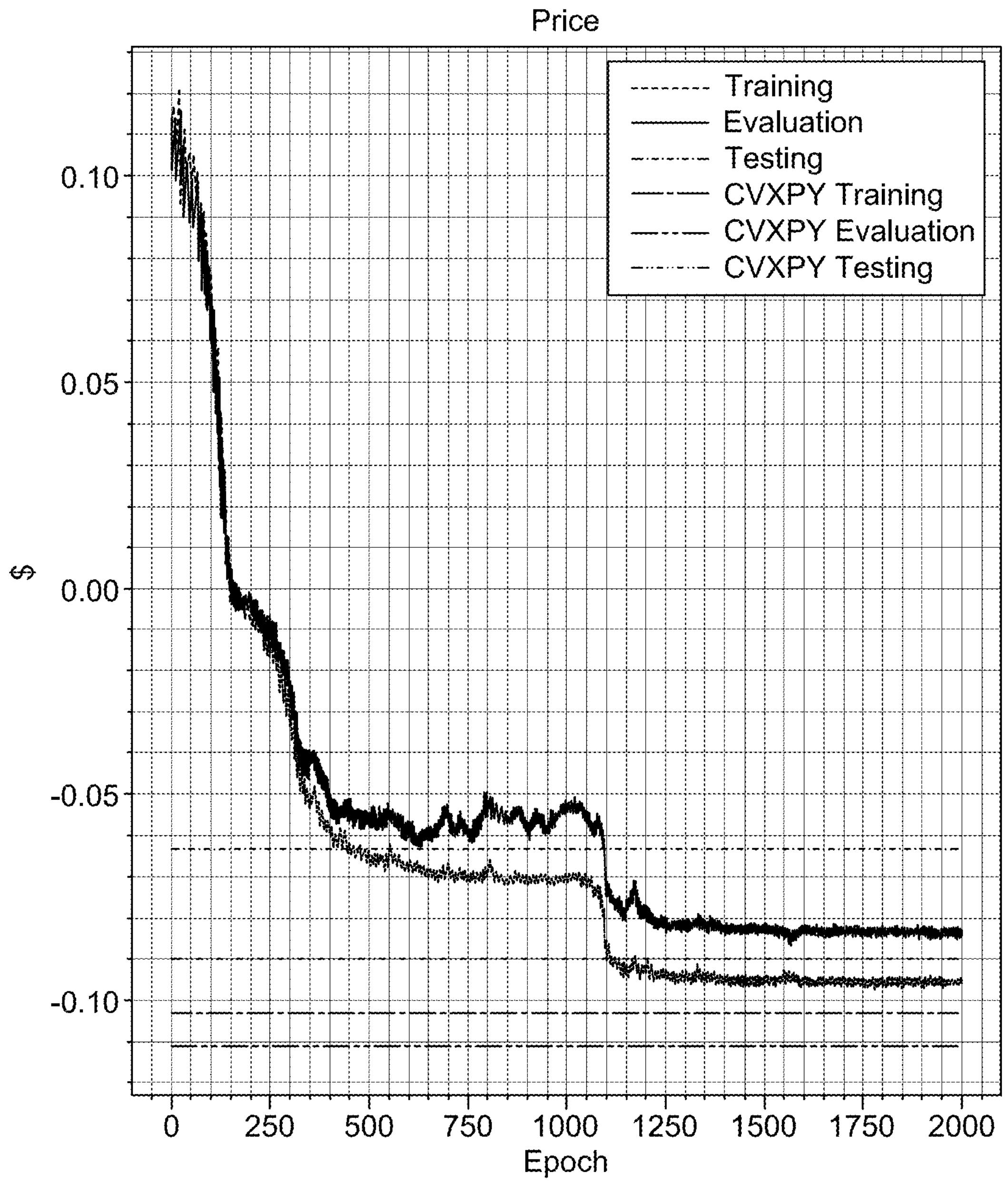
FIGS. 13A, 13B illustrate a sample of solutions with CVXPY solver.
Figure 13B:
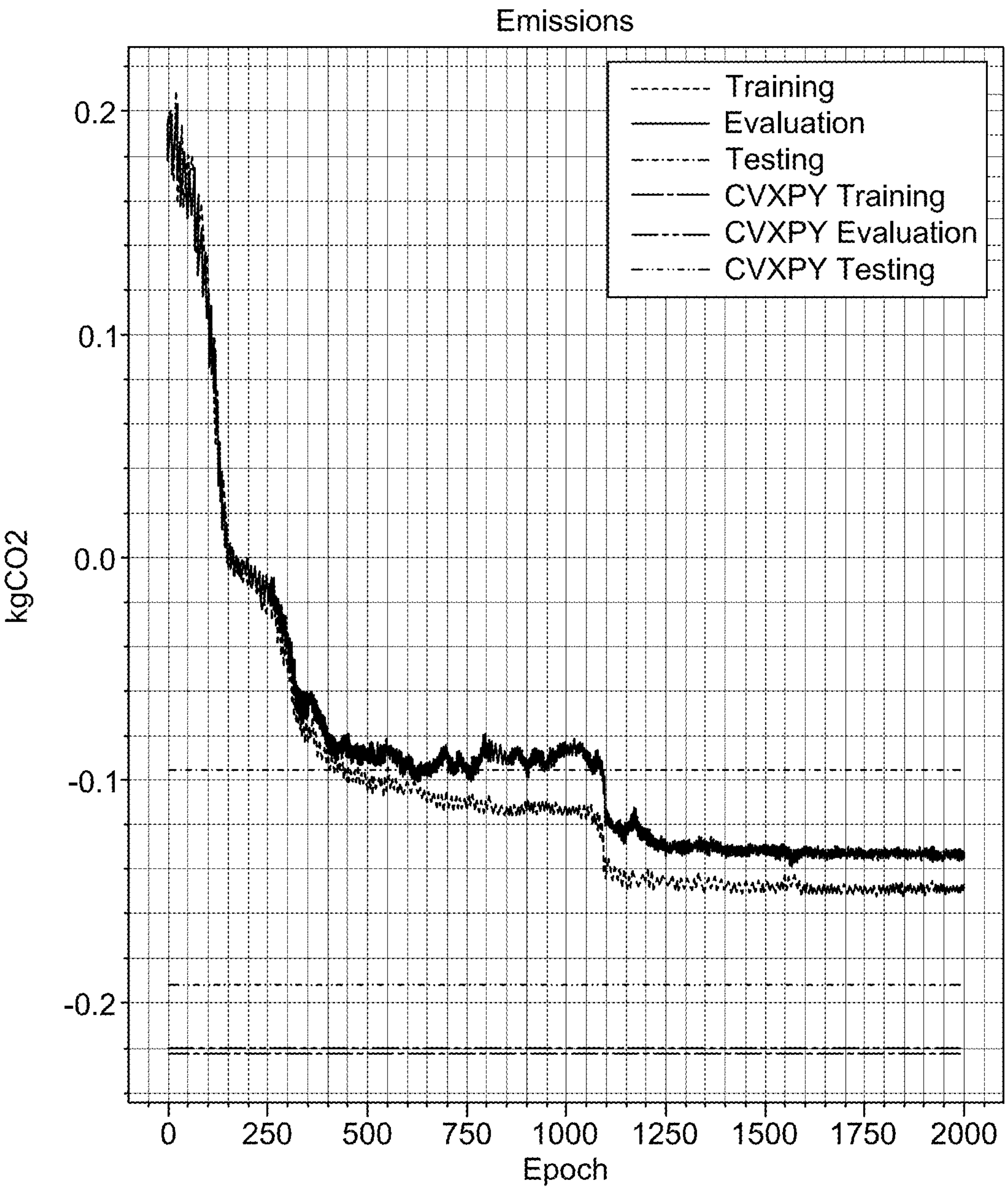
Figure 14A:
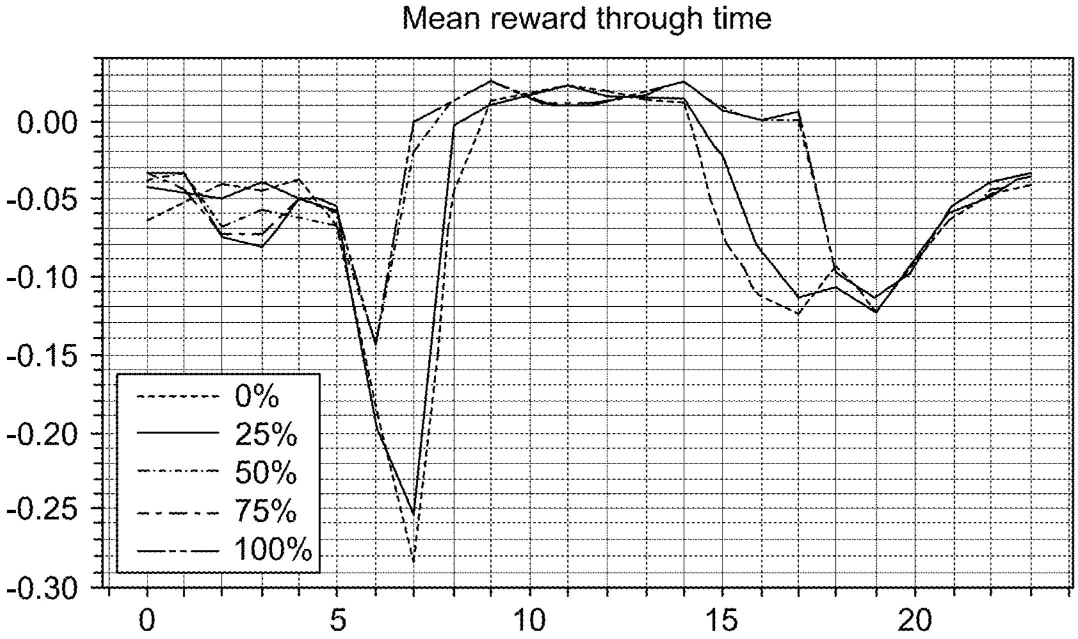
FIGS. 14A-14J are graphs of results of the A2C with a dataset that does not have noise.
Figure 14B:
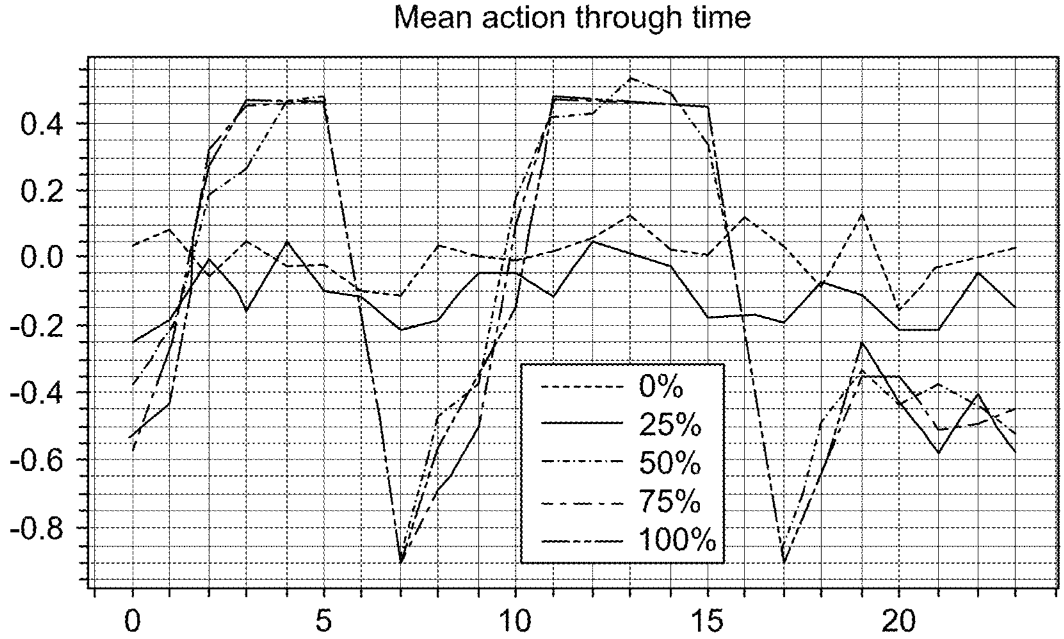
Figure 14C:
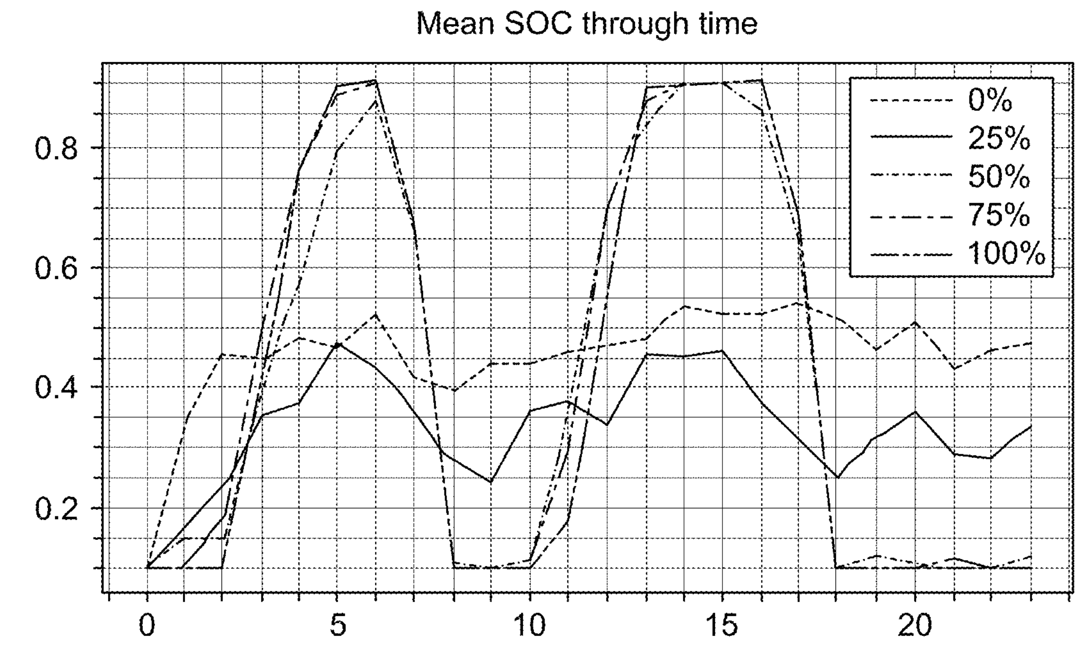
Figure 14D:
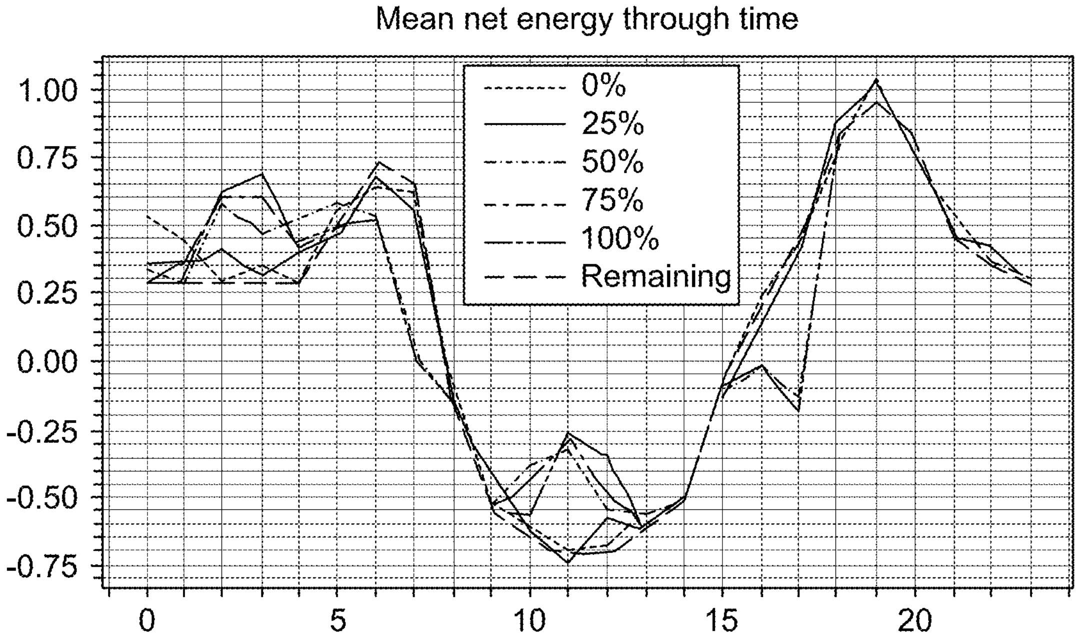
Figure 14E:
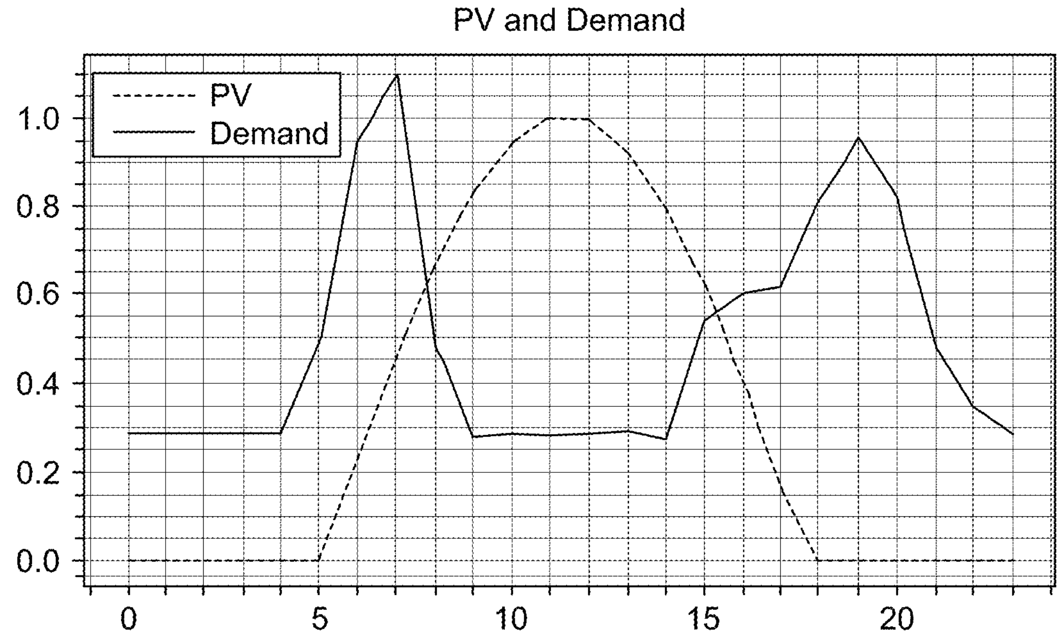
Figure 14F:
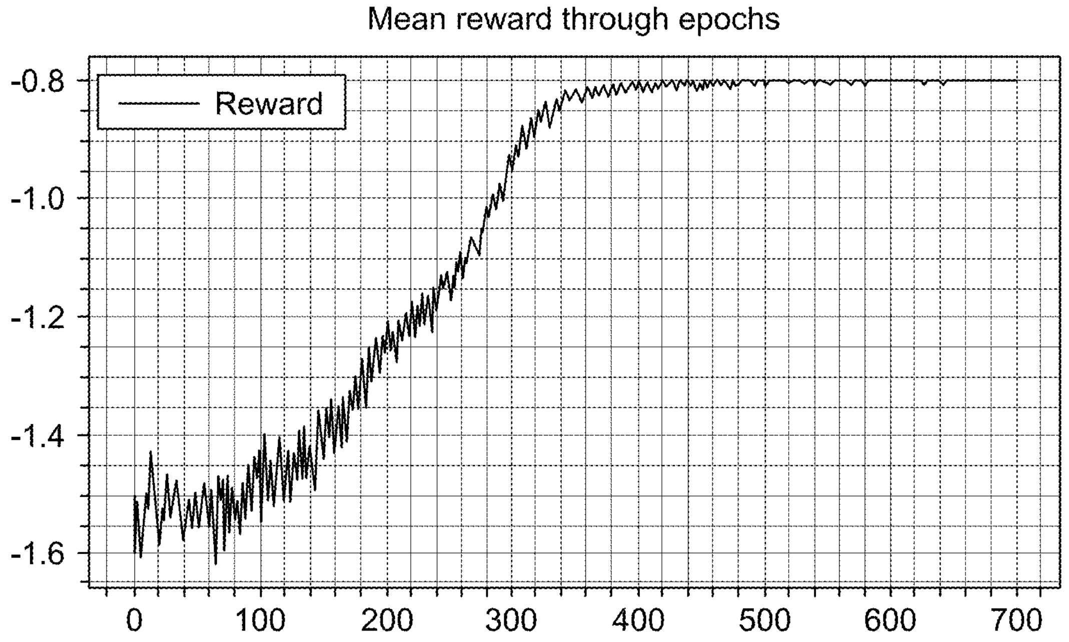
Figure 14G:
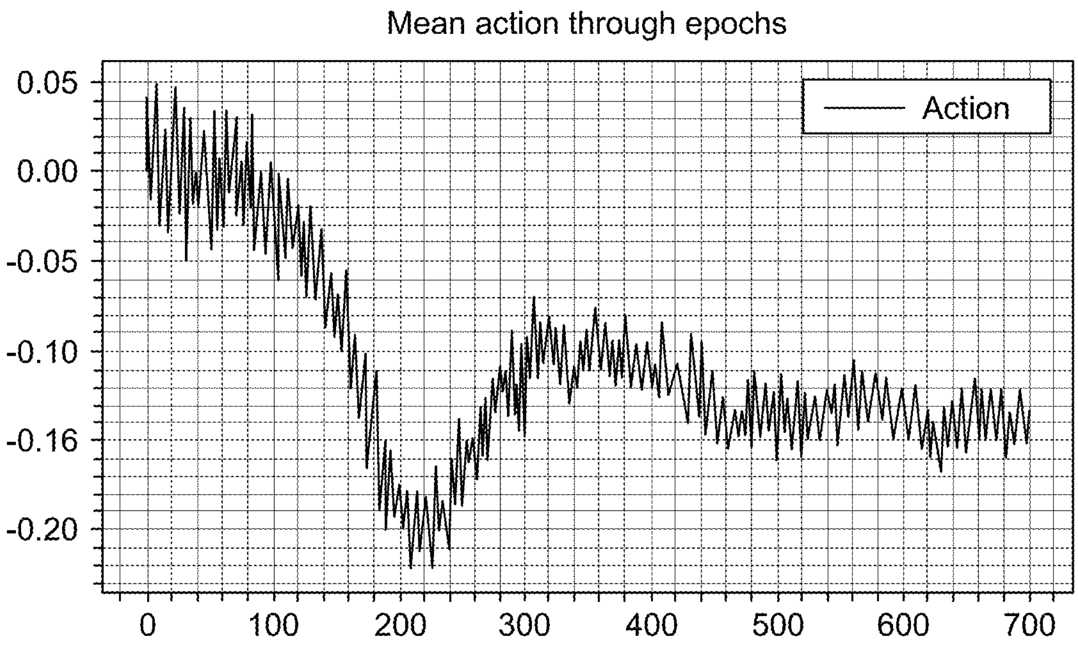
Figure 14H:
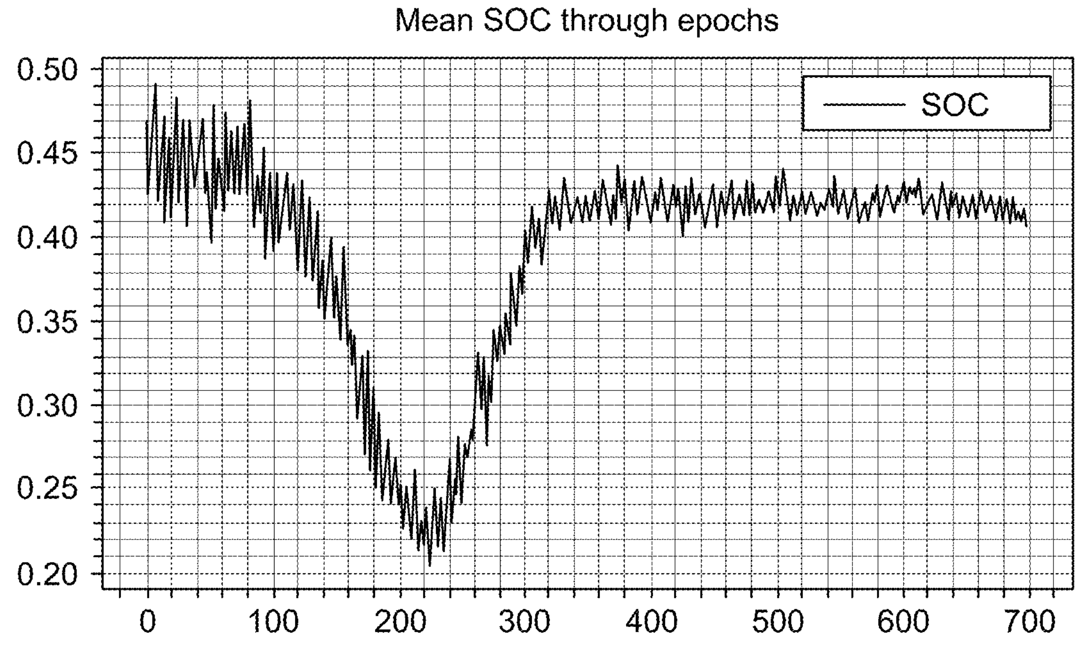
Figure 14I:
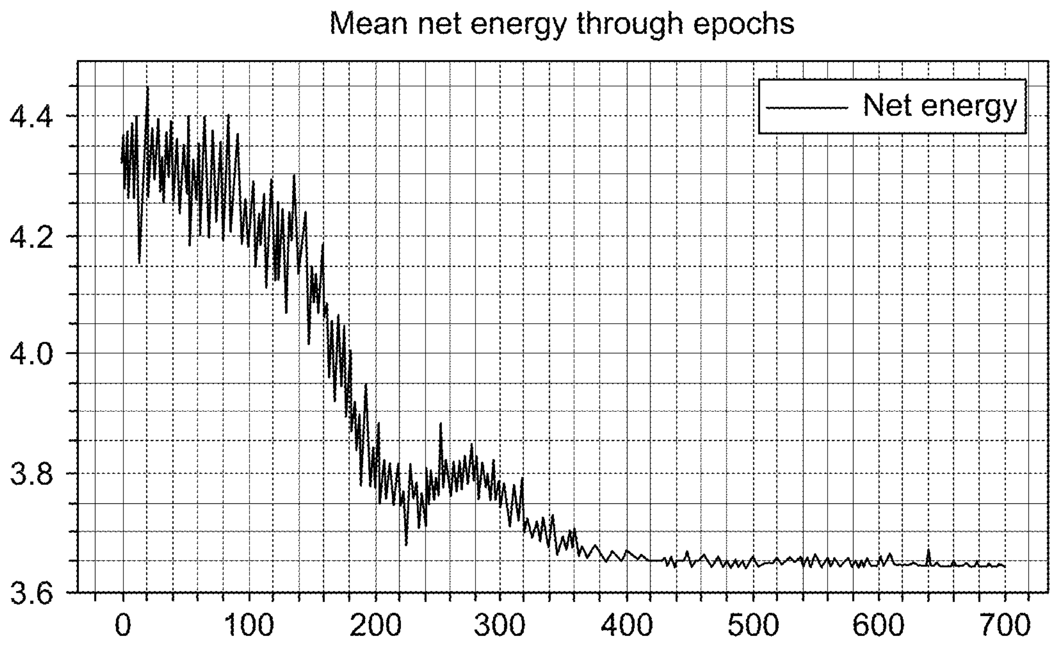
Figure 14J:
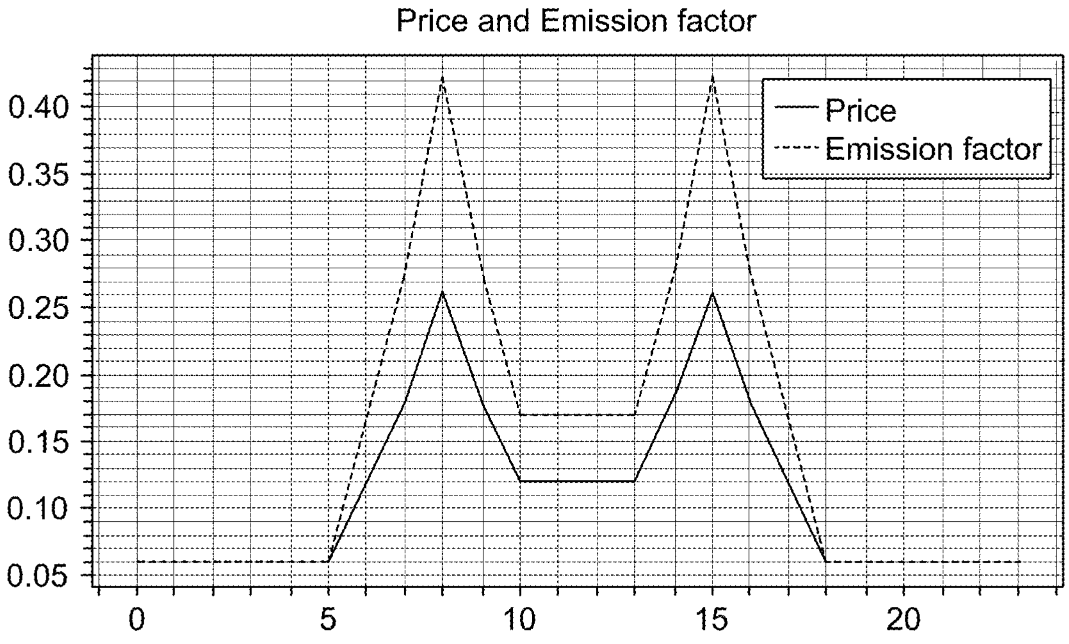
Figure 15A:
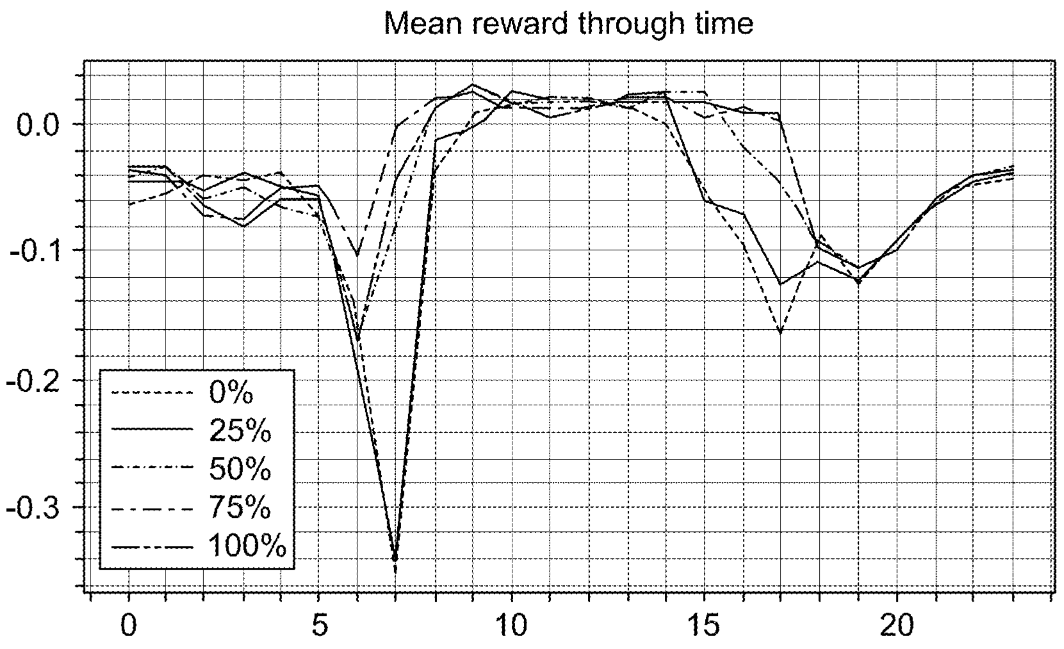
FIGS. 15A-15J are graphs of results of the A2C with a dataset that has noise.
Figure 15B:
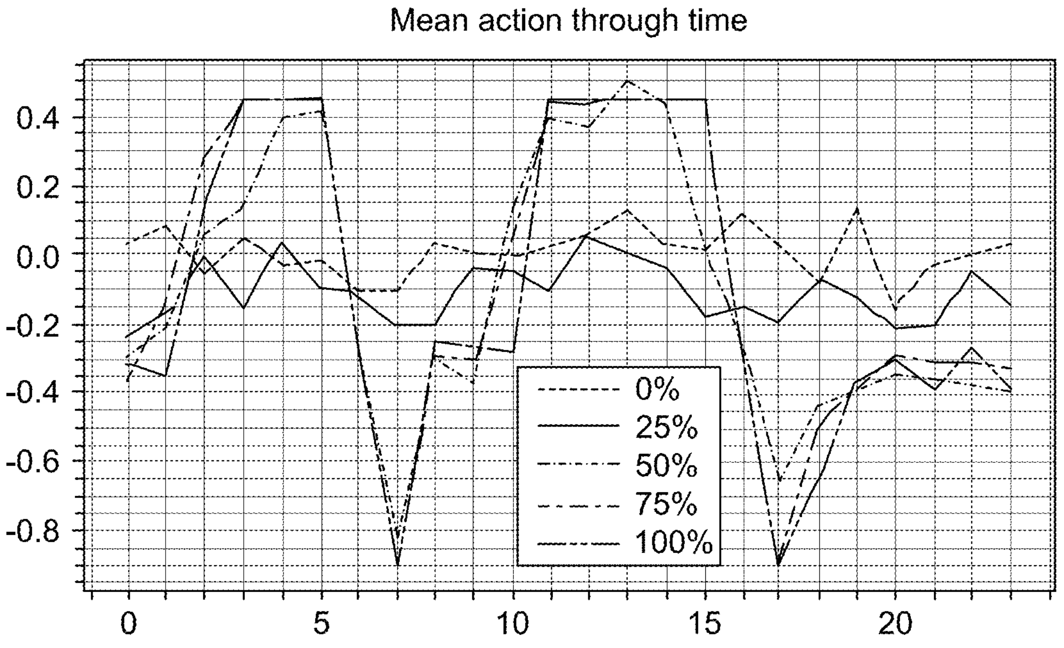
Figure 15C:
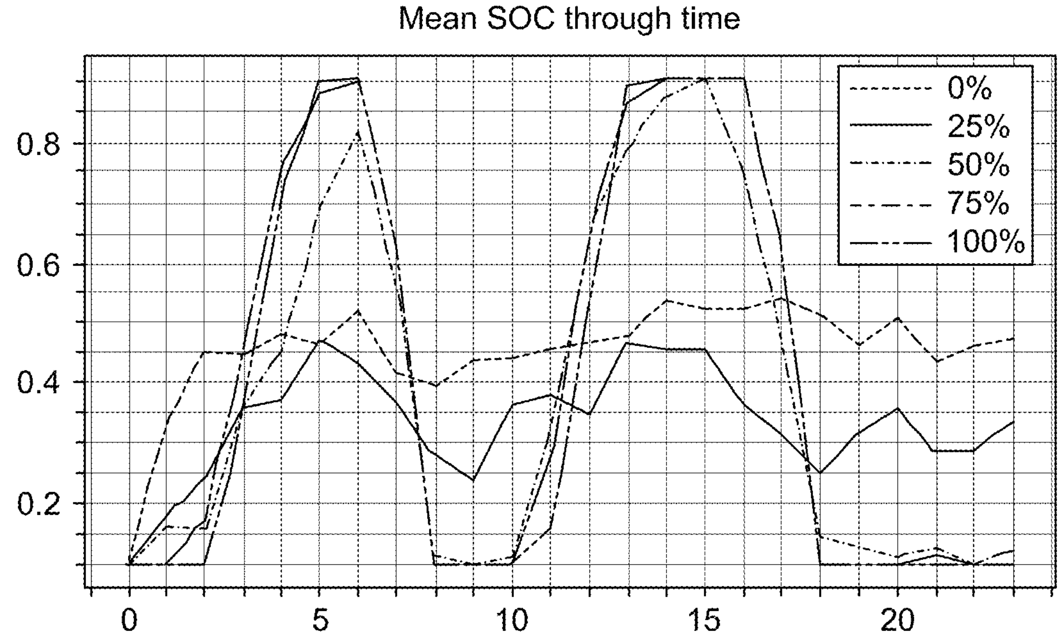
Figure 15D:
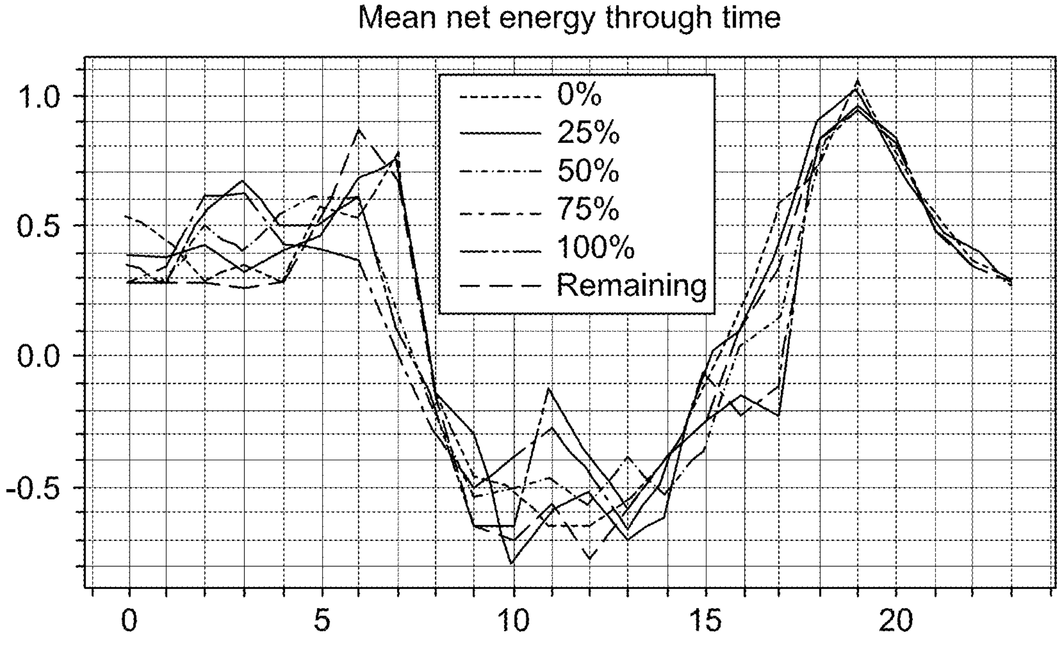
Figure 15E:
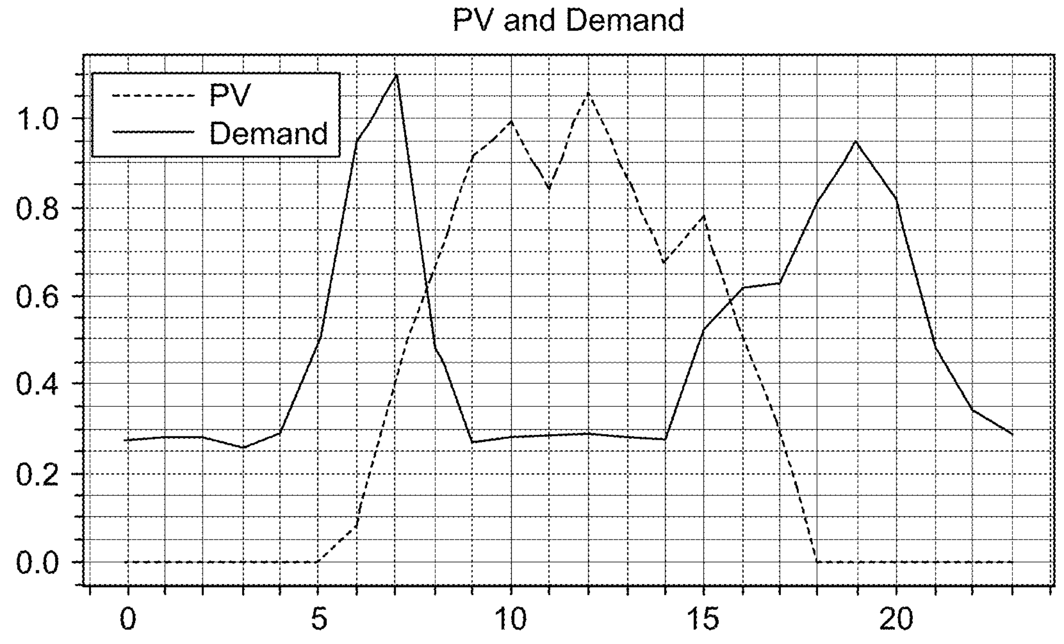
Figure 15F:
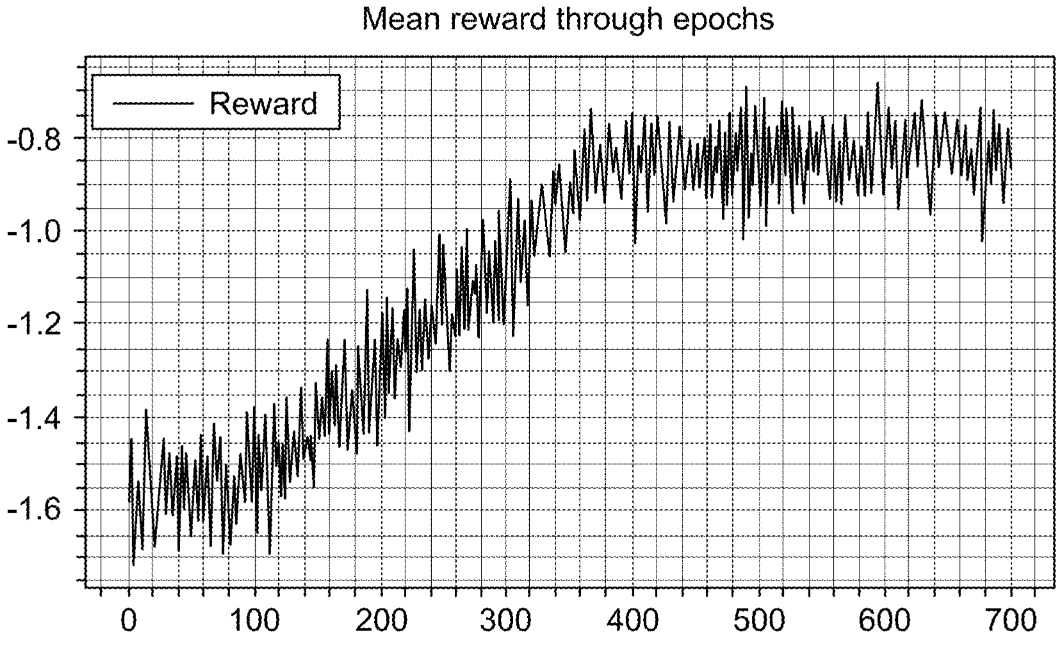
Figure 15G:
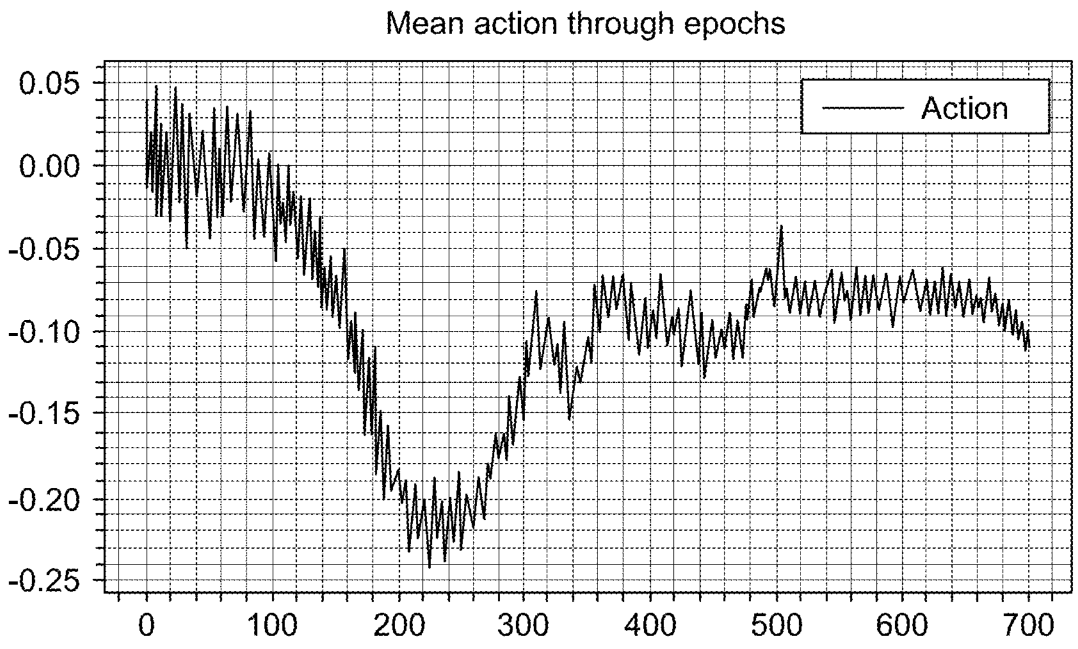
Figure 15H:
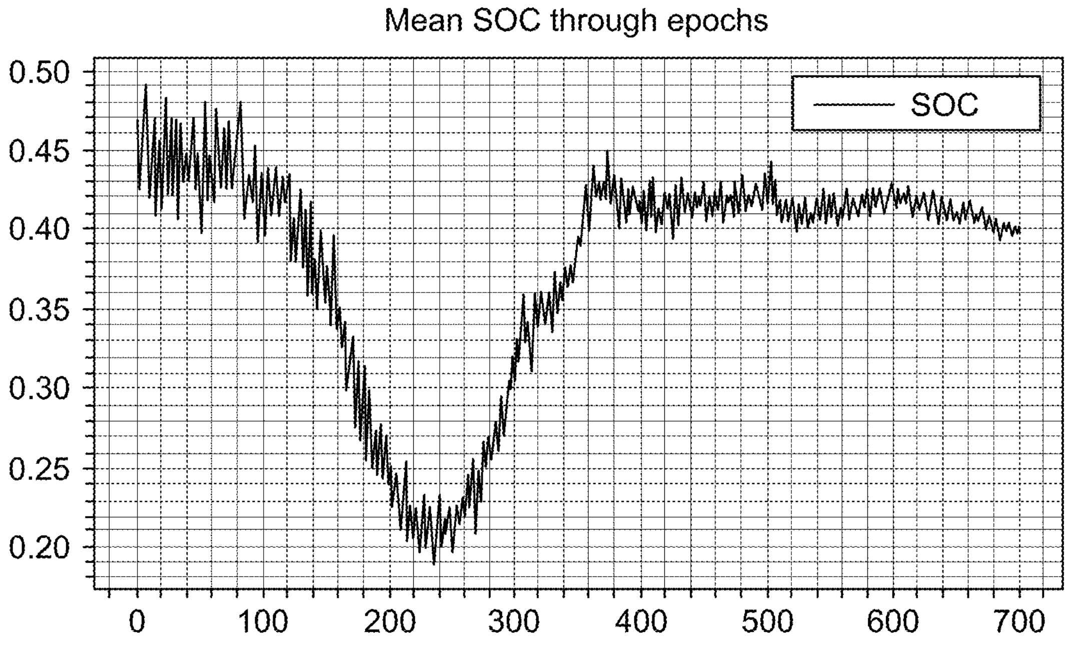
Figure 15I:
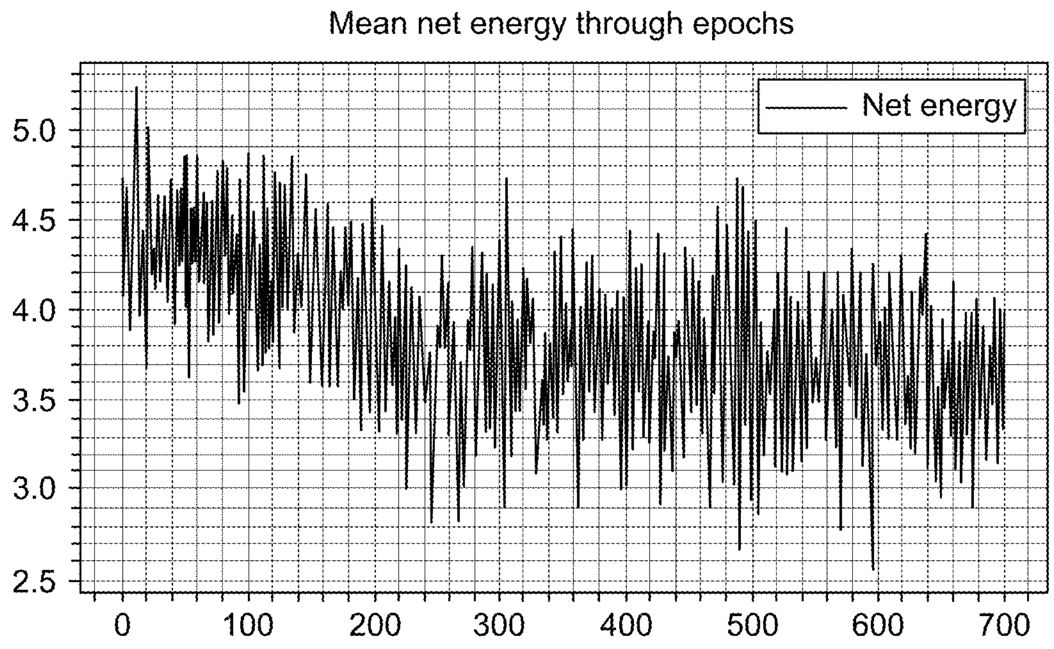
Figure 15J:
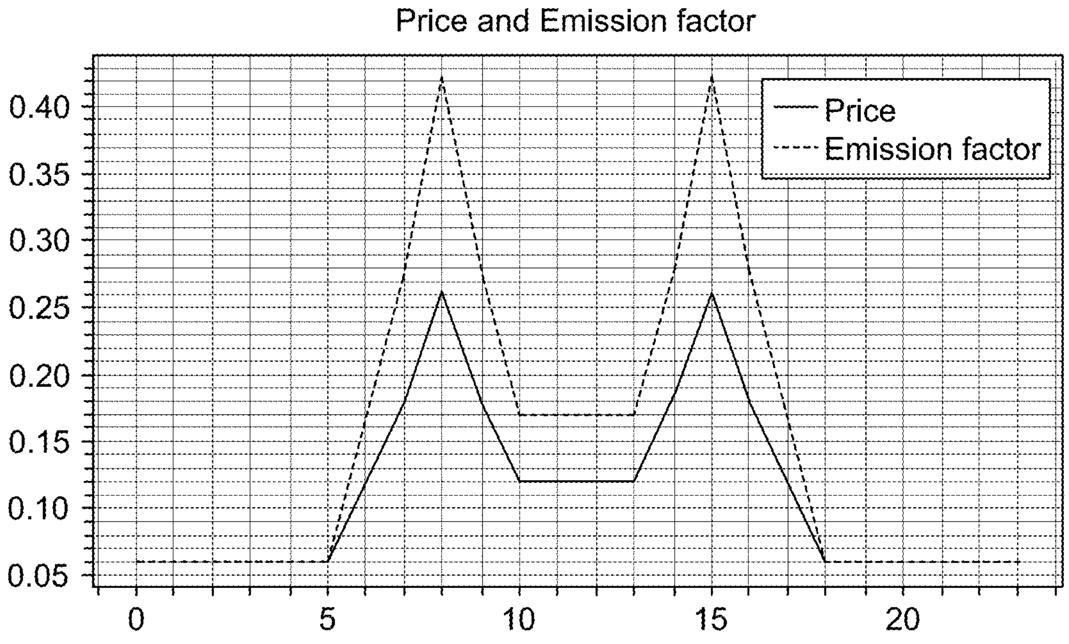

The configurations for the training, evaluating, and testing in the project are found in FIGS. 13A, 13B. Price score (FIG. 13A) and Emissions score (FIG. 13B) comparisons are illustrated between CVXPY solver and A2C in the microgrid for all 3 stages (training, evaluation, and testing). As demonstrated, for train and evaluation, the microgrids are of 6 houses, but for testing, there are 10. For the final results, the RL algorithm works with multiple houses (microgrid) simultaneously, whereas before, the RL algorithm was working with only one house.

FIGS. 14A-14J are graphs of results of the A2C with a dataset that does not have noise. FIGS. 15A-15J are graphs of results of the a2C with a dataset that has noise. The data generated for the demand of the different houses are based on the main pattern for each profile, nonetheless what changes between homes is the state of the battery and the generation of energy with the solar panels (PV), which is not the same because of the incorporation of noise (shown in FIG. 14E and FIG. 15E in the figure "PV and Demand") for the generation and the energy load, both modeled using the Gaussian distributions $N_{pv}(0, 0.1)$ and $N_{load}(0, 0.01)$. Solar energy generation takes a sine function, shifting it to start after 5 am and shortening it to mimic the morning/daylight. After that, noise is incorporated to replicate the possible clouds or weather conditions that can be present. The noise shows that there's a different result in the mean net energy through time (shown in FIG. 14D and FIG. 15D in the figure "Mean net energy through time").

As shown in the tables above, some houses have no solar energy production (the ones in 0's), which means they need to rely on the battery to make decisions related to the energy. At this point, there is also no battery cell price so far. Battery cell price is one of the parameters that is incorporated in the following steps to see more dynamics in the microgrid.

Hyperparameters

In Table 3, the following hyperparameters are defined for the training after fine-tuning using grid search. Since there's less variance in the Advantage Actor-Critic (A2C), the number of epochs needed is less than using a policy gradient (PG).

TABLE 3

Hyper-parameter configuration for RL algorithms of the first layer.

| | PG | A2C |
|---|---|---|
| Number of discrete actions | 40 | 40 |
| Learning rate of the actor | 0.00381 | 0.00245 |
| Hidden layers of the actor | 128 | 128 |
| Learning rate of the critic | — | 0.001 |
| Hidden layers of the critic | — | 128 |
| Discount factor | 1.0 | 1.0 |
| Batch size | 3.2 | 32 |
| Roll-out steps | 24 | 24 |
| Training steps | 2000 | 2000 |

TABLE 4

Configuration of the houses in the microgrid for Training A2C.

| | $house_1$ | $house_2$ | $house_3$ | $house_4$ | $house_5$ | $house_6$ |
|---|---|---|---|---|---|---|
| profile_type | family | business | teenagers | family | business | teenagers |
| profile_peak_load | 1 | 1 | 1 | 0.5 | 0.3 | 0.2 |
| battery_random_soc_0 | False | False | False | False | False | False |
| battery_capacity | 1 | 1 | 1 | 1 | 1 | 1 |
| battery_efficiency | 1 | 1 | 1 | 1 | 1 | 1 |
| battery_soc_max | 0.9 | 0.9 | 0.9 | 0.9 | 0.9 | 0.9 |
| battery_soc_min | 0.1 | 0.1 | 0.1 | 0.1 | 0.1 | 0.1 |
| battery_p_charge_max | 0.8 | 0.8 | 0.8 | 0.8 | 0.8 | 0.8 |
| battery_p_discharge_max | 0.8 | 0.8 | 0.8 | 0.8 | 0.8 | 0.8 |
| pv_peak_pv_gen | 1 | 1 | 1 | 0.0 | 1 | 0.6 |

TABLE 5

Configuration of the houses in the microgrid for Evaluating A2C.

| | $house_1$ | $house_2$ | $house_3$ | $house_4$ | $house_5$ | $house_6$ |
|---|---|---|---|---|---|---|
| profile_type | family | business | teenagers | family | business | teenagers |
| profile_peak_load | 1 | 0.8 | 0.5 | 0.2 | 0.3 | 0.2 |

TABLE 5-continued

Configuration of the houses in the microgrid for Evaluating A2C.

| | house$_1$ | house$_2$ | house$_3$ | house$_4$ | house$_5$ | house$_6$ |
|---|---|---|---|---|---|---|
| battery_random_soc_0 | False | False | False | False | False | False |
| battery_capacity | 1 | 1 | 1 | 0.5 | 0.9 | 0.9 |
| battery_efficiency | 1 | 1 | 1 | 1 | 1 | 1 |
| battery_soc_max | 0.9 | 0.9 | 0.9 | 0.9 | 0.9 | 0.9 |
| battery_soc_min | 0.1 | 0.1 | 0.1 | 0.1 | 0.1 | 0.1 |
| battery_p_charge_max | 0.8 | 0.8 | 0.8 | 0.8 | 0.8 | 0.8 |
| battery_p_discharge_max | 0.8 | 0.8 | 0.8 | 0.8 | 0.8 | 0.8 |
| pv_peak_pv_gen | 0.5 | 1 | 0 | 1 | 0.3 | 0.6 |

TABLE 6

Configuration of the houses in the microgrid for Testing A2C.

| | house$_1$ | house$_2$ | house$_3$ | house$_4$ |
|---|---|---|---|---|
| profile_type | family | business | teenagers | family |
| profile_peak_load | 1 | 1 | 1 | 0.2 |
| battery_random_soc_0 | False | False | False | False |
| battery_capacity | 1 | 1 | 1 | 1 |
| battery_efficiency | 1 | 1 | 1 | 1 |
| battery_soc_max | 0.9 | 0.9 | 0.9 | 0.9 |
| battery_soc_min | 0.1 | 0.1 | 0.1 | 0.1 |
| battery_p_charge_max | 0.8 | 0.8 | 0.8 | 0.8 |
| battery_p_discharge_max | 0.8 | 0.8 | 0.8 | 0.8 |
| pv_peak_pv_gen | 0 | 0 | 0 | 0.7 |

| | house$_5$ | house$_6$ | house$_7$ |
|---|---|---|---|
| profile_type | business | teenagers | family |
| profile_peak_load | 0.6 | 0.4 | 0.4 |
| battery_random_soc_0 | False | False | False |
| battery_capacity | 1 | 1 | 0.8 |
| battery_efficiency | 1 | 1 | 1 |
| battery_soc_max | 0.9 | 0.9 | 0.9 |
| battery_soc_min | 0.1 | 0.1 | 0.1 |
| battery_p_charge_max | 0.8 | 0.8 | 0.8 |
| battery_p_discharge_max | 0.8 | 0.8 | 0.8 |
| pv_peak_pv_gen | 1 | 0.7 | 1 |

| | house$_8$ | house$_9$ | house$_{10}$ |
|---|---|---|---|
| profile_type | business | teenagers | family |
| profile_peak_load | 1 | 0.1 | 1 |
| battery_random_soc_0 | False | False | False |
| battery_capacity | 0.2 | 1 | 0.2 |
| battery_efficiency | 1 | 1 | 1 |
| battery_soc_max | 0.9 | 0.9 | 0.9 |
| battery_soc_min | 0.1 | 0.1 | 0.1 |
| battery_p_charge_max | 0.8 | 0.8 | 0.8 |
| battery_p_discharge_max | 0.8 | 0.8 | 0.8 |
| pv_peak_pv_gen | 1 | 1 | 0 |

The above-described hardware description is a non-limiting example of corresponding structure for performing the functionality described herein.

Numerous modifications and variations of the present disclosure are possible in light of the above teachings. It is therefore to be understood that within the scope of the appended claims, the invention may be practiced otherwise than as specifically described herein.

The invention claimed is:

1. A hierarchical transactive energy control system for controlling a plurality of microgrids, comprising:

a distributor reinforcement learning agent distributing electric power among the plurality of microgrids by facilitating energy trading among the microgrids in a manner that takes into account carbon emission by setting buy and sell prices among the plurality of microgrids;

a plurality of microgrid reinforcement learning agents for each of the plurality of microgrids, wherein each microgrid agent controls a plurality of household electric loads and is configured to access energy available at other microgrids or provide energy to said other microgrids, wherein the plurality of microgrid reinforcement learning agents set a sell price and a buy price for the plurality of household electric loads in respective microgrids which are controlled by a respective said microgrid reinforcement learning agents; and a plurality of household reinforcement learning agents for controlling each of the plurality of household electric loads, wherein at least one active consumer household includes an energy storage device, wherein the household reinforcement learning agent for the at least one consumer household determines how to optimize energy usage from the energy storage device;

wherein each of said household reinforcement learning agents is a reinforcement machine learning model having an actor and a critic with an advantage function, in which a value V is subtracted from an expected reward, for doing an action in a given state, in order to re-calibrate the expected reward towards an average action, wherein the reward takes into account the carbon emission, wherein the action is to charge or discharge the battery, wherein the state is the state of charge of the battery.

2. The hierarchical control system of claim 1, wherein the energy storage device includes at least one battery that releases energy by discharging.

3. The hierarchical control system of claim 1, wherein the plurality of household electric loads includes at least one passive consumer household that consume energy generated from an external grid.

4. The hierarchical control system of claim 1, wherein the plurality of household electric loads includes at least one passive prosumer household that is configured to access a renewable energy source to produce energy during hours of daylight.

5. The hierarchical control system of claim 1, wherein the plurality of household electric loads includes at least one active prosumer household that is configured to access batteries for energy dispatch.

6. The hierarchical control system of claim 4, wherein the renewable energy source includes at least one photovoltaic panel that generates electricity.

7. The hierarchical control system of claim 1, wherein the critic is a neural network that approximates the value V based on actions taken by the actor.

8. The hierarchical control system of claim 1, wherein each of said household reinforcement learning agents includes a policy neural network that maps states to actions and learns which action is optimal.

9. The hierarchical control system of claim 1, wherein the plurality of household reinforcement learning agents share parameters for the actor and critic, wherein each household agent of the plurality of household reinforcement learning agents uses different observations associated with the respective household to take different actions.

10. A method for transactive energy control in a hierarchical multi-agent control system, the hierarchical multi-agent control system comprising a household layer, a microgrid layer, and a distributor layer, wherein the household layer includes a plurality of household reinforcement learning agents, the microgrid layer includes a plurality of microgrid reinforcement learning agents, and the distributor layer includes a distributor reinforcement learning agent, the method comprising:

controlling, by each household reinforcement learning agent, a household electric load and charging and discharging of respective household batteries, training each household reinforcement learning agent as an actor-critic reinforcement learning model, in which a critic neural network evaluates actions of an actor neural network and approximates states of the actor neural network, wherein the actions include the charging and discharging the respective household batteries, wherein the states include state of charge of the household batteries;

when energy in the household layer is in a shortage state, importing energy from an external power grid, and when energy in the household layer is in a surplus state, exporting energy to the external power grid, in a manner that energy imported and energy exported is minimized;

maximizing, by a microgrid reinforcement learning agent, use of local energy in the microgrid based on a pricing policy for local transactions, when a microgrid is in an energy shortage state such that its local energy is insufficient to cover internal demand, accessing energy in other microgrids, when a microgrid is in an energy surplus state such that distributed generation surpasses the internal demand, selling energy to other microgrids experiencing a shortage, when energy is unavailable at the microgrid layer, importing energy from the distributor layer, when the energy is over-produced at the microgrid layer, exporting energy to the distributor layer;

setting, by the distributor reinforcement learning agent, buy and sell prices among the microgrids in a manner that simultaneously facilitates energy trading among the microgrids and minimizes carbon emissions.

11. The method of claim 10, wherein the training each household agent is performed by training a single shared critic neural network and a single shared actor neural network.

12. The method of claim 10, wherein the actor includes obtaining an expected reward from doing an action with the household battery while in a state of the household battery, wherein the expected reward includes a penalty that is based on an amount of carbon emission.

13. The method of claim 10, further comprising generating energy by discharging at least one battery.

14. The method of claim 10, further comprising consuming energy generated from an external grid.

15. The method of claim 10, further comprising accessing a renewable energy source to produce energy during hours of daylight.

16. A method for transactive energy control in a hierarchical multi-agent control system, the hierarchical multi-agent control system comprising a household layer, a microgrid layer, and a distributor layer, wherein the household layer includes a plurality of household reinforcement learning agents, the microgrid layer includes a plurality of microgrid reinforcement learning agents, and the distributor layer includes a distributor reinforcement learning agent, the method comprising:

controlling, by each household reinforcement learning agent, a household electric load and charging and discharging of respective household batteries, when energy in the household layer is in a shortage state, importing energy from an external power grid, and when energy in the household layer is in a surplus state, exporting energy to the external power grid, in a manner that energy imported and energy exported is minimized:

maximizing, by a microgrid reinforcement learning agent, use of local energy in the microgrid based on a pricing policy for local transactions, when a microgrid is in an energy shortage state such that its local energy is insufficient to cover internal demand, accessing energy in other microgrids, when a microgrid is in an energy surplus state such that distributed generation surpasses the internal demand, selling energy to other microgrids experiencing a shortage, when energy is unavailable at the microgrid layer, importing energy from the distributor layer, when the energy is over-produced at the microgrid layer, exporting energy to the distributor layer;

setting, by the distributor reinforcement learning agent, buy and sell prices among the microgrids in a manner that simultaneously facilitates energy trading among the microgrids and minimizes carbon emissions:

wherein each said household reinforcement learning agent is a reinforcement machine learning model having an actor and a critic with an advantage function, subtracting a value V from an expected reward, for doing an action in a given state, in order to re-calibrate the expected reward towards an average action, wherein the reward takes into account the carbon emission, wherein the action is to charge or discharge a household battery, wherein the state is the state of charge of the household battery.

17. The method of claim 16, further comprising approximating the value V, by the critic, based on the action taken by the actor.

* * * * *